United States Patent
Koganezawa et al.

(10) Patent No.: US 8,613,186 B2
(45) Date of Patent: Dec. 24, 2013

(54) TWO-SHAFT GAS TURBINE

(75) Inventors: Tomomi Koganezawa, Tokai (JP);
Shinichi Higuchi, Hitachinaka (JP);
Yasuo Takahashi, Mito (JP); Ryo Akiyama, Hitachinaka (JP); Shinya Marushima, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 1256 days.

(21) Appl. No.: 12/466,818

(22) Filed: May 15, 2009

(65) Prior Publication Data
US 2009/0320438 A1 Dec. 31, 2009

(30) Foreign Application Priority Data

| | | |
|---|---|---|
| May 15, 2008 | (JP) | 2008-128100 |
| Jul. 31, 2008 | (JP) | 2008-197176 |
| Sep. 12, 2008 | (JP) | 2008-234167 |
| Mar. 11, 2009 | (JP) | 2009-057281 |

(51) Int. Cl.
*F02C 6/00* (2006.01)
*F02G 1/00* (2006.01)
*F02G 3/00* (2006.01)

(52) U.S. Cl.
USPC ..... 60/39.15; 60/39.19; 60/39.182; 60/39.53; 60/782; 60/785; 60/774; 60/39.181; 60/39.511; 261/115; 261/118

(58) Field of Classification Search
USPC ........... 60/772, 39.182, 39.181, 39.511, 39.5, 60/39.53, 39.54, 806, 39.17, 791, 792, 60/39.162, 782, 785; 261/115, 118
See application file for complete search history.

(56) References Cited

U.S. PATENT DOCUMENTS

| | | | |
|---|---|---|---|
| 4,569,195 A | | 2/1986 | Johnson |
| 4,660,375 A | * | 4/1987 | Hyde et al. ..................... 60/773 |
| 6,668,538 B2 | * | 12/2003 | Sugishita et al. .......... 60/39.182 |
| 7,096,659 B1 | * | 8/2006 | Hatamiya et al. ............. 60/39.5 |
| 2003/0070415 A1 | | 4/2003 | Hatamiya et al. |
| 2007/0214766 A1 | * | 9/2007 | Obana et al. ................. 60/39.15 |

FOREIGN PATENT DOCUMENTS

| | | |
|---|---|---|
| JP | 60-256522 | 12/1985 |
| JP | 05-018271 | 1/1993 |
| JP | 2003-083081 | 3/2003 |
| WO | WO-00/25009 | 4/2000 |
| WO | WO 00/25009 | 5/2000 |

* cited by examiner

*Primary Examiner* — Gerald L Sung
*Assistant Examiner* — Craig Kim
(74) *Attorney, Agent, or Firm* — Foley & Lardner LLP

(57) ABSTRACT

Provided in one embodiment is a two-shaft gas turbine that exhibits improved reliability, output power, and efficiency. The turbine operates stably by establishing a balance between the driving force of a compressor and the output power of a high-pressure turbine in the case where the two-shaft gas turbine is applied to a system, in which the flow rate of a fluid flowing into a combustor is higher than a simple cycle gas turbine. A portion of the fluid driving the high-pressure turbine is allowed to flow not into the high-pressure turbine but into a low-pressure turbine.

15 Claims, 19 Drawing Sheets

TWO-SHAFT GAS TURBINE

This application claims priority from Japanese Patent Applications 2008-128100 filed on May 15, 2008; 2008-197176 filed on Jul. 31, 2008; 2008-234167 filed on Sep. 12, 2008 and 2009-057281 filed on Mar. 11, 2009. The entire contents of the aforementioned applications are incorporated herein by reference.

BACKGROUND OF THE INVENTION

1. Field of the Invention

The present invention relates to a two-shaft gas turbine in which a high-pressure turbine for driving a compressor and a low-pressure turbine for power output are configured to have respective different shafts. The two-shaft gas turbine is applied to a gas turbine system having an increased amount of fluid flowing into a combustor compared with a simple cycle, such as, e.g., a humid air system, a steam injection system, a nitrogen injection system, or a low-calorific fuel firing system.

2. Description of the Related Art

For example, JP-A-2003-83081 (FIG. 5) and JP-A-5-18271 describe the technology of a two-shaft gas turbine in which a high-pressure turbine for driving a compressor and a low-pressure turbine for driving a generator or a pump are configured to have respective different shafts.

The two-shaft gas turbine can rotate the compressor and the high-pressure turbine at high speeds even if a driven device (load) such as a pump or a screw is low in rotation speed. Because of this, the two-shaft gas turbine can increase the torque of the low-pressure turbine in a low rotation speed zone. For this reason, the two-shaft gas turbine is mainly used to drive a machine such as a pump or a screw. However, the two-shaft gas turbine can also be used for electric power generation by use of the low-pressure turbine driving a generator. If the low-pressure turbine is used without reduction gears, the two-shaft gas turbine has an advantage that high-efficiency can be achieved by rotating the compressor at high speeds. Even if the reduction gears are used, a reduction ratio can be reduced to advantageously provide reduced cost and improved efficiency.

Incidentally, FIG. 5 of JP-A-2003-83081 describes the technology of a humidity gas turbine system in which moisture is added to gas turbine working fluid (e.g. air) for humidification and the thermal energy of the gas turbine exhaust gas is recovered by a recuperator, thereby improving output power and efficiency.

On the other hand, WO00/25009 discloses the technology of a humidity gas turbine system in which water is added for humidification to the working fluid (e.g., air) of a gas turbine, and the thermal energy of exhaust gas discharged from the gas turbine is recovered by such humidified air and supplied to the gas turbine for improving output power and efficiency.

SUMMARY OF THE INVENTION

A humidity gas turbine system is such that moisture is added to compressed air compressed by a compressor to increase the flow rate of working fluid to be supplied to a combustor, thereby increasing the output power of a turbine. However, if the technology of the humidity gas turbine system is applied to a two-shaft gas turbine, the humidification will increase the output power of a high-pressure turbine driving a compressor. In this case, the compressor will excessively be rotated if nothing is done. The excessive rotation of the compressor will cause the blade vibration and shaft vibration of the compressor and of the high-pressure turbine. Since it is probable that sympathetic vibration with such vibrations may damage rotary components, it is not preferred to excessively rotate the compressor.

As a measure of preventing the excessive rotation of the compressor, a method is conceivable of reducing a flow rate of fuel supplied to a combustor to control the rotation speed of the compressor into a given value. If this method is adopted, however, the turbine inlet temperature drops to lower the efficiency of the gas turbine. This will lower an efficiency-improving effect which is an original aim of the humidity gas turbine system.

As a second measure of preventing the excessive rotation of the compressor, a method is conceivable of mechanically previously setting the output power of the high-pressure turbine and of the low-pressure turbine so as to optimize the load distribution therebetween in humidifying compressed air.

If this method is adopted, however, the output power of the high-pressure turbine becomes smaller than power needed to drive the compressor. When compressed air is not humidified, such as when the gas turbine is started, the compressor will be rotated at excessively low rotation speed. Similarly to the excessive rotation, the excessively low rotation of the compressor vibrates sympathetically with the blade vibration and shaft vibration of the compressor and of the high-pressure turbine. This leads to damage to the rotary components. In addition, this undesirably leads to a reduction in the flow rate and pressure ratio of the gas turbine working fluid as well as to lowering in the compression efficiency thereof. For the gas turbine previously setting the load distribution between the high-pressure turbine and the low-pressure turbine as described above, turbine blades become dedicated to the humid air gas turbine. That is to say, the turbine blades cannot be shared by the simple cycle and the humid air gas turbine; therefore, they are increased in production cost.

The same problem as described above is shared by a gas turbine system in which the flow rate of working fluid supplied to a combustor is increased compared with the simple cycle gas turbine. The following gas turbine system can be conceivable as an example of such a gas turbine system. Extra steam is injected into the combustor of the gas turbine to improve efficiency in a combined cycle gas turbine system or a cogeneration system in which heat of the exhaust gas of the gas turbine is used to produce steam for use. In a plant equipped with an air separation system, the same problem occurs in a gas turbine system in which extra nitrogen is injected into a gas turbine combustor to increase output power and to reduce NOx. A low-calorific fuel-firing gas turbine system needs to burn a large quantity of fuel compared with the simple cycle gas turbine so that the flow rate of working fluid increases accordingly. This poses the same problem as above if the low-calorific fuel-firing gas turbine system is applied to the two-shaft gas turbine.

It is an object of the present invention, therefore, to provide a two-shaft gas turbine with improved reliability that improves output power and efficiency and is stably operated by establishing a balance between the driving force of a compressor and the output power of a high-pressure turbine in the case where the two-shaft gas turbine is applied to such a system that the flow rate of fluid flowing into a combustor is increased compared with a simple cycle gas turbine.

To achieve the above object, the present invention provides such a configuration that a portion of working fluid driving a high-pressure turbine is allowed to flow not into a high-pressure turbine but into a low-pressure turbine in the case where if combustion temperature during rated operation is made equal to rated combustion temperature of a simple cycle, a compressor will have rotation speed excessively higher than rated rotation speed.

The present invention can achieve a two-shaft gas turbine that can improve efficiency and establish a balance between the driving force of a compressor and the output power of a high-pressure turbine, thereby providing stable operation and enhanced reliability.

DESCRIPTION OF THE PREFERRED EMBODIMENTS

The present invention relates to a configuration and a control method for high-efficient operation along with power matching between a compressor and a turbine in the case of applying a humidity gas turbine system to a two-shaft gas turbine in which a high-pressure turbine for driving a compressor and a low-pressure turbine for power output are configured to have respective different shafts.

In particular, the present invention relates to a two-shaft gas turbine in which if combustion temperature during rated operation is made equal to the rated combustion temperature in the simple cycle, a compressor will have rotation speed excessively higher than the rated rotation speed. Although a description is given of embodiments as below, examples of this two-shaft gas turbine include a humidity gas turbine in which air or working fluid is humidified by humidification to increase the flow rate of the working fluid; a gas turbine in which extra steam or nitrogen is injected into a combustor or into a working medium; and a low-calorific gas firing gas turbine in which a heat value is less than that of usually used natural gas. The reason is because these gas turbines have such a system that the flow rate of fluid flowing into the combustor is increased compared with that of the simple cycle gas turbine. If these gas turbines are operated at the same combustion temperature as that of the simple cycle, the flow rate of fluid supplied to a high-pressure turbine from the combustor is increased to increase the rotation speed of the high-pressure turbine and of the compressor. Thus, the high-pressure turbine and the compressor provide rotation speed excessively higher than a rated rotation speed. It is to be noted that the rated rotation speed means rotation speed encountered when the simple cycle gas turbine performs rated operation at rated combustion temperature.

Preferred embodiments in which the present invention is applied to a two-shaft gas turbine will hereinafter be described with reference to the drawings.

First Embodiment

Figure 1:
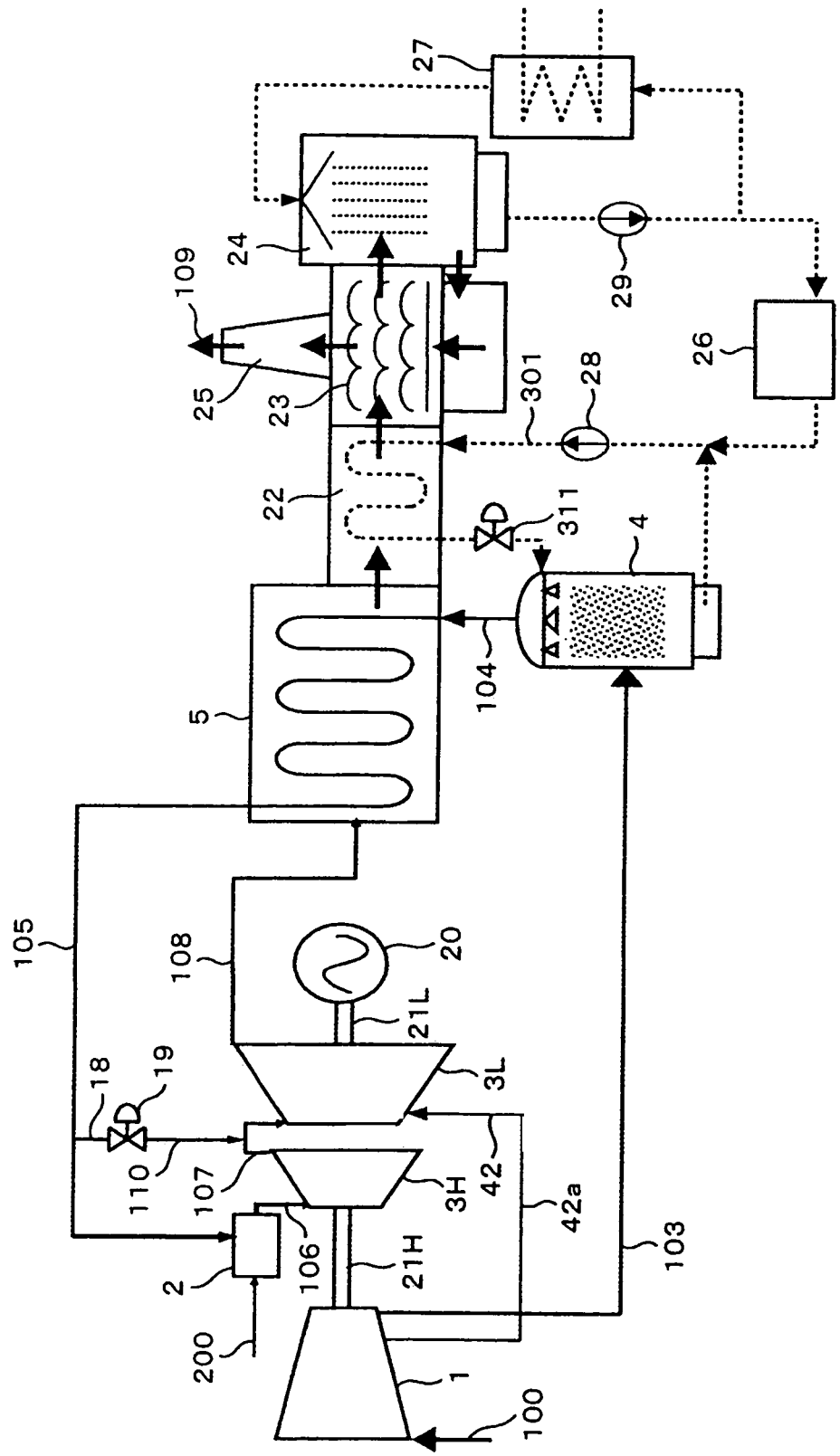
FIG. 1 is a system flow diagram illustrating a configuration of a humidity gas turbine system according to a first embodiment of the present invention.

A description is given of a first embodiment of a two-shaft gas turbine system in which the present invention is applied to a humidity gas turbine system with reference to FIG. 1.

FIG. 1 is a system flow diagram illustrating an overall configuration of the two-shaft gas turbine constituting part of the humidity gas turbine system according to the first embodiment of the present invention.

Referring to FIG. 1, the two-shaft gas turbine installed in the humidity gas turbine system for power generation includes a compressor 1, a combustor 2, a high-pressure turbine 3H, a low-pressure turbine 3L, a humidifier 4, and a recuperator 5. The compressor 1 compresses air to produce high-pressure air. The combustor 2 is adapted to mix supplied fuel 200 with combustion air to produce high-temperature combustion gas. The high-pressure turbine 3H is driven by the high-temperature combustion gas produced by the combustor 2. The low-pressure turbine 3L is driven by the high-pressure turbine exhaust gas flowing from the high-pressure turbine 3H. The humidifier 4 is adapted to humidify the high-pressure air produced by the compressor 1. The recuperator 5 is adapted to heat the humid air humidified by the humidifier 4 by thermal exchange with the low-pressure turbine exhaust gas discharged from the low-pressure turbine 3L, thereby producing high-temperature air supplied to the combustor 2 and to the inlet of the low-pressure turbine 3L. This gas turbine provides electric power generated by the generator 20 rotated by the low-pressure turbine 3L.

Purge air is supplied to an initial state nozzle of the low-pressure turbine installed at the inlet of the low-pressure turbine 3L. This purge air uses purge air 42 extracted from a middle stage of the compressor 1 and led to a cavity formed inside the casing of the turbine via an air passage 42a.

The compressor 1 and the high-pressure turbine 3H are connected together via a shaft 21H and provide the same rotation speed. The low-pressure turbine 3L and the generator 20 are connected together via a shaft 21L and provide the same rotation speed.

The low-pressure turbine 3L and the generator 20 may be connected together via reduction gears not illustrated. In this case, the rotation speed of the low-pressure turbine 3L is greater than that of the generator 20 by a reduction ratio of the reduction gears.

The shaft 21H connecting the compressor 1 with the high-pressure turbine 3H is not connected to the shaft 21L connecting the low-pressure turbine 3L with the generator 20. Therefore, although providing different rotation speeds, the compressor 1 and the low-pressure turbine 3L can be used, that is, their rotation speeds can be set freely.

The two-shaft gas turbine configured as above may replace the generator 20 with a driven device such as a pump or a screw. Even if the rotation speed of such a driven device is low, the compressor 1 and the high-pressure turbine 3H can be rotated at high speeds. Thus, the low-pressure turbine 3L driving the driven device can be increased in torque in a low rotation speed zone.

A description is next given of how to operate the two-shaft gas turbine, illustrated in FIG. 1, to which the humidity gas turbine system is applied. In this gas turbine, air 100 (atmospheric pressure) is compressed by the compressor 1 and the compressed high-pressure air is extracted from the compressor 1 as extracted air 103.

The extracted air 103 is supplied from the compressor 1 to the humidifier 4, in which water is added to the extracted air 103 to produce the low temperature high humidity air 104.

Humidification by a wetted-wall column or a humidification tower may be adopted as a humidifying method of humidifying the extracted air 103 by the humidifier 4. Alternatively, a humidifying method may be adopted in which a spray nozzle is disposed in a passage for the extracted air 103 to spray water.

The low temperature high humidity air 104 to which moisture is added by the humidifier 4 is supplied to the recuperator 5. In the recuperator 5, the humid air is heated by thermal exchange with the low-pressure turbine exhaust gas 108 discharged from the low-pressure turbine 3L to raise temperature, becoming high temperature high humidity air 105. The high temperature high humidity air 105 is supplied from the recuperator 5 to the combustor 2, in which the high temperature high humidity air is mixed with fuel 200 for combustion, thereby producing high-temperature combustion gas 106.

By adopting the humidity gas turbine system configured as above, in the recuperator 5 the thermal energy of the low-pressure exhaust gas 108 discharged from the low-pressure turbine 3L can be recovered into the high temperature high humidity air 105 to be burned in the combustor 2. Therefore, the amount of fuel 200 supplied to the combustor 2 can be reduced to improve the efficiency of the gas turbine cycle.

The low temperature high humidity air 104 is produced by being added moisture in the humidifier 4. Then, the low temperature high humidity air 104 becomes the high temperature high humidity 105, which is burned in the combustor 2 to produce high temperature combustion gas 106. Consequently, the working fluid adapted to drive the high-pressure turbine 3H and the low-pressure turbine 3L is increased to increase the output power of the gas turbine cycle.

Further, because of moisture addition in the humidifier 4, the low temperature high humidity air 104 provides a temperature-lowering effect and a flow-increasing effect. This can allow the high temperature high humidity air 105 to increase a recovery amount of heat recovered by thermal exchange with the low-pressure turbine exhaust gas 108 in the recuperator 5. Thus, the humidity gas turbine cycle can be increased in efficiency.

The humidity gas turbine system is provided with a branch passage or path 18 in the middle of a supply passage through which the high temperature high humidity air 105 raised in temperature in the recuperator 5 is supplied to the combustor 2. A portion of the high temperature high humidity air 105 supplied to the combustor 2 is divided as divided high temperature high humidity air 110 flowing along the branch passage 18. The divided high temperature high humidity air 110 is hereinafter abbreviated also to the divided air 110.

As described later, on the upstream side of the low-pressure turbine 3L the divided air 110 merges with high pressure turbine exhaust gas 107 flowing from the high-pressure turbine 3H.

A flow control valve 19 which is a flow control mechanism is installed in the branch passage 18. The flow rate of the divided air 110 can be controlled by adjusting the flow control valve 19.

The high temperature combustion gas 106 resulting from combustion in the combustor 2 is supplied to and drives the high-pressure turbine 3H.

The high pressure turbine exhaust gas 107 flowing from the high-pressure turbine 3H merges with the divided air 110 flowing along the branch passage 18. Then, both are supplied to and drive the low-pressure turbine 3L and become low-pressure turbine exhaust gas 108, which is discharged from the low-pressure turbine 3L.

The low-pressure turbine exhaust gas 108 discharged from the low-pressure turbine 3L is supplied to the recuperator 5 installed on the downstream side of the low-pressure turbine 3L. In the recuperator 5 the low-pressure turbine exhaust gas 108 is subjected to thermal exchange with the low temperature high humidity air 104 supplied from the humidifier 4. The low-pressure turbine exhaust gas 108 flowing from the recuperator 5 flows through an economizer 22, an exhaust gas reheater 23, and a water recovery system 24 installed in this order on the downstream side of the recuperator 5. Then, the low-pressure turbine exhaust gas 108 is discharged as exhaust gas 109 from an exhaust tower 25 into the atmosphere.

In the water recovery system 24, water is sprayed into the flowing low-pressure turbine exhaust gas 108 to recover as water the moisture contained in the low-pressure turbine exhaust gas 108. The recovered water is supplied by a pump 29 to a water treatment system 26 for purification. The water purified by the water treatment system 26 is supplied as makeup water 301 by a pump 28 to the economizer 22.

The water recovery system 24 is provided with a circulation passage adapted to circulate spray water therethrough by means of a pump 29. A heat exchanger 27 is installed in the circulation passage to cool the spray water.

The economizer 22 recovers heat by thermal exchange between the makeup water 301 supplied from the water treatment system 26 and the low-pressure turbine exhaust gas 108 flowing through the economizer 22. The makeup water 301 raised in temperature by the economizer 22 is supplied as humidity water to the humidifier 4.

A flow control valve 311 is installed between the economizer 22 and the humidifier 4 so as to adjust the flow rate of the humidity water to be supplied to the humidifier 4.

The efficiency-improving effect of the humidity gas turbine cycle is discussed from the view point of exhaust gas. Since the thermal energy is recovered from the low-pressure turbine exhaust gas 108 in the recuperator 5 and economizer 22, the efficiency of the gas turbine cycle is improved to reduce waste thermal energy discharged as the exhaust gas 109 from the exhaust tower 25 into the atmosphere. Thus, the temperature of the exhaust gas 109 can be lowered according to the reduced waste thermal energy.

In the two-shaft gas turbine to which the above-described humidity gas turbine cycle is applied, the drive force obtained by the high-pressure turbine 3H is transmitted via the shaft 21H to the compressor 1 for rotation. This compressor 1 is used to pressurize the air 100.

The drive force obtained by the low-pressure turbine 3L is transmitted via the shaft 21L to the generator 20 for driving. The generator 20 generates and provides electric power.

Incidentally, the driven machine driven by the low-pressure turbine 3L may be a pump or a screw in place of the generator 20.

A description is next given of a method of establishing a balance between the power of the compressor 1 and that of the high-pressure turbine 3H in the two-shaft gas turbine installed in the humidity gas turbine cycle.

The following is first considered: The flow rate of the humidity water for humidification to be supplied to the humidifier 4 is equal to zero. The high-temperature air 105 supplied from the recuperator 5 fully flows into the combustor 2 and is supplied to the high-pressure turbine 3H. The flow rate of the divided air 110, of the high-temperature air 105, supplied to the inlet of the low-pressure turbine 3H via the branch passage 18 is equal to zero.

The gas turbine cycle configured as described above corresponds to a recuperated cycle. However, the flow rate of the working fluid is not increased between the compressor 1 and the high-pressure turbine 3H; therefore, such a gas turbine cycle is equivalent to the simple cycle from the viewpoint of power balance.

The gas turbine cycle operated under the conditions of rated speed and rated combustion temperature is designed to establish a balance between the power of the compressor 1 and that of the high-pressure turbine 3H.

The following is next considered: From the state where the power is balanced between the compressor 1 and the high-pressure turbine 3H, the flow rate of the humidity water supplied to the humidifier 4 is increased to the given flow rate of the humidity gas turbine system.

In this case, moisture is added in the humidifier 4 to increase the flow rate of the working fluid. The total flow rate of the working fluid flows into the combustor 2 where combustion of the working fluid produces the combustion gas 106, which drives the high-pressure turbine 3H.

If nothing is done, however, the output power of the high-pressure turbine 3H is increased to excessively rotate the compressor 1. To prevent the excessive rotation, the flow rate of the fuel 200 to be supplied to the combustor 2 is controllably reduced to allow the combustor 2 to execute combustion at a combustion temperature lower than a rated combustion temperature. This establishes a balance between the power of the compressor 1 and that of the high-pressure turbine 3H.

However, the combustion temperature lower than the rated combustion temperature reduces the efficiency of the gas turbine. Even if the humidity gas turbine system is applied to the two-shaft gas turbine system, therefore, an anticipated improvement in efficiency will be small.

Then, the following case is considered: The branch passage 18 is provided which is adapted to divide a portion, as the divided air 110, of the high temperature high humidity air 105 to be supplied from the recuperator 5 to the combustor 2. The flow control valve 19 which is the branch flow control mechanism provided in the branch passage 18 is operated to increase the flow rate of the divided air 110 supplied to the low-pressure turbine 3L via the branch passage 18.

For example, the high temperature high humidity air 110 is divided from the high temperature high humidity air 105 at the flow rate equivalent to the rate of the moisture added to in the humidifier 4 and is supplied to the upstream of the low-pressure turbine 3L. In such a case, the flow rate of air flowing into the high-pressure turbine 3H becomes equal to that at the time of non-humidification. This establishes a balance between the power of the compressor 1 and that of the high-pressure turbine 3H, so that the combustion temperature in the combustor 2 can be raised to the rated combustion temperature. As a result, the high efficiency of the gas turbine can be maintained.

The pressure energy of the divided air 110 is recovered by the low-pressure turbine 3L. Because of this, the compression power consumed by the compressor 1 to compress the divided air 110 is not wasted, for example, compared with the case where the increase of the working fluid resulting from the addition of moisture is released to establish the balance.

Specifically, for the high humidity gas turbine system described above, if the combustion temperature during rated operation is made equal to the rated combustion temperature in the simple cycle, the rotation speed of the compressor 1 is excessive compared with the rated rotation speed. In contrast to this, a portion of the high temperature high humidity air 110 which is working fluid used to drive the high-pressure turbine 3H is allowed to flow not into the high-pressure turbine 3H but into the low-pressure turbine 3L. This can improve efficiency and further establish a balance between the drive force of the compressor 1 and the output power of the high-pressure turbine 3H for stably operating the gas turbine.

Incidentally, in the two-shaft gas turbine provided for the humidity gas turbine cycle in the present embodiment, the mass flow rate of the divided air 110 is 10-25% of the mass flow rate of the compressor inlet air 100 of the compressor 1.

This is because of the following. If the flow rate of the divided air 110 is substantially equal to the flow rate equivalent to the volume of moisture added in the humidifier 4, the flow rate of air flowing into the high-pressure turbine 3H is equal to that at the time of non-humidification. Thus, the power of the compressor 1 and that of the high-pressure turbine 3H are balanced.

The addition amount of moisture is determined to maximize the thermal efficiency of the system. If the addition amount of moisture is small, of the amount of heat recovered by the economizer 22 an amount of heat added to the working fluid is reduced not to increase the thermal efficiency. In contrast, if the addition amount of moisture is too much, the moisture contained in the exhaust gas 108 is increased. Therefore, the thermal efficiency is not increased according to the latent heat of the moisture that is not effectively used. As described above, the addition amount of moisture has an optimum value. The flow rate of the divided air 110 determined according to the addition volume of moisture is preferably 10-25%.

In this way, even if the two-shaft gas turbine is applied to the humidity gas turbine system, while preventing the excessive rotation speeds and excessively low rotation speeds of the compressor 1, the drive force of the compressor 1 and the output power of the high-pressure turbine 3H are balanced to stably operate the two-shaft gas turbine. In addition, the reliability with respect to the blade vibration and shaft vibration of the rotary components can be increased to extend the component's life.

The turbine inlet temperature can be maintained at a temperature assumed in the simple cycle. Therefore, also the two-shaft gas turbine can enjoy the efficiency-improving effect of the gas turbine resulting from the application of the humidity gas turbine system.

Further, both the high-pressure turbine and the low-pressure turbine can be shared by the simple cycle and the humidity gas turbine system. It is possible, therefore, to reduce development and production cost and parts management cost for turbine blades which is high-temperature parts.

Furthermore, while sharing turbine blades taking effort, cost and time for development, the simple cycle, the recuperated cycle and the humidity gas turbine system, i.e., three kinds of product lineup different in output power and in efficiency from one another can be offered. Additionally, since the turbine blades are shared by all products, reliability evaluation of life and the like can be performed in an integrated fashion so that a more reliable product family can be established.

The effects as described above can be provided by the two-shaft gas turbine including a flow rate increasing means such as the humidifier 4 for increasing the flow rate of the working fluid containing air compressed by the compressor; the combustor 2 adapted to burn the increased working fluid and fuel to produce combustion gas; the high-pressure turbine 3H driven by the combustion gas produced by the combustor 2; and the low-pressure turbine 3L driven by exhaust gas (the combustion gas driving the high-pressure turbine 3H) from the high-pressure turbine 3H; and configured such that the high-pressure turbine 3H and the low-pressure turbine 3L have the respective independent shafts, wherein the two-shaft gas turbine is further provided with the branch passage 18 which is a branch path adapted to divide a portion of the working fluid before supply to the combustor 2 and lead it to the low-pressure turbine 3L, the working fluid being high temperature high humidity air being humidified by the humidifier 4 or flow rate increasing means to increase its flow rate. While described later, specifically, the branch passage 18 may need only to connect with the inside of a gas pass between a final stage blade of the high-pressure turbine 3H and an initial stage nozzle of the low-pressure turbine 3L, the gas pass being a passage adapted to lead the exhaust gas resulting from driving the high-pressure turbine 3H, to the low-pressure turbine 3L.

Incidentally, the divided air 110 is injected into the low-pressure turbine 3L to increase the inlet pressure of the low-pressure turbine accordingly; therefore, also the outlet pressure of the high-pressure turbine 3H is increased. This slightly reduces the expansion ratio of the high-pressure turbine 3H to slightly lower output power. Then, more preferably, the flow rate of the divided air 110 is made slightly less than the volume equivalent to the addition volume of moisture and the flow rate of air flowing into the high-pressure turbine 3H is slightly increased compared with during non-humidification. Thus, when the compressor and the high-pressure turbine are balanced in the rated combustion temperature in this way, it is more preferred that the pressure ratio be slightly higher than that during non-humidification.

That is to say, it is needed only to be provided with a branch flow rate adjusting mechanism which controls the flow rate of the fluid divided by the branch passage 18 which is a branch path in a flow rate range less than the flow rate increased by the humidifier 4 which is the flow rate increasing means.

The two-shaft gas turbine of the present embodiment described above is not limited to the application to a newly constructed plant. This can preferably be applied to the case where, for example, an existing simple cycle gas turbine or recuperated cycle gas turbine is remodeled into the two-shaft gas turbine plant to which the humidity gas turbine system is applied. A description is next given of a case where the two-shaft gas turbine of the existing simple cycle is remodeled into a plant to which the humidity gas turbine system is applied, with reference to FIG. 1.

In the two-shaft gas turbine illustrated in FIG. 1, the basic configuration of an existing simple cycle gas turbine includes the compressor 1, the combustor 2, the high-pressure turbine 3H and the low-pressure turbine 3L. This existing simple cycle gas turbine is remodeled into a plant to which the humidity gas turbine system is applied. In this case, apparatuses to be additionally installed are the humidifier 4 and the recuperator 5. For the remodeling, the supply system of the extracted air 103 connected from the compressor 1 to the combustor 2 in the simple cycle is modified such that the extracted air 103 is supplied from the compressor 1 to the combustor 2 via the humidifier 4 and via the recuperator 5 as illustrated in FIG. 1. Incidentally, it is preferred that apparatuses such as the economizer 22, the exhaust gas reheater 23, the water recovery system 24, the water treatment system 26 and the cooler 30 be additionally installed together with the humidifier 4 and the recuperator 5 so as to improve the overall efficiency of the plant.

A possible problem resulting from the remodeling into the two-shaft gas turbine to which the humidity gas turbine system is applied involves the excessive rotation speeds and excessively low rotation speeds of the compressor described above. Then, also when the simple cycle is remodeled, the branch passage 18 is provided which leads a portion, as divided air 110, of the high temperature high humidity air 105 to the upstream of the low-pressure turbine 3L from the passage adapted to supply the high temperature high humidity air 105 from the recuperator 5 to the combustor 2. In this way, the above-mentioned problem can be solved.

A description is next given of the remodeling of the existing recuperated cycle gas turbine. The basic configuration of the two-shaft gas turbine of the recuperated cycle includes the compressor 1, the combustor 2, the high-pressure turbine 3H, the low-pressure turbine 3L and the recuperator 5. Apparatuses to be added to remodel the existing tow-shaft gas turbine of the recuperated cycle are the humidifier 4 installed between the compressor 1 and the recuperator 5. Also in this case, the branch passage 18 is provided which is adapted to lead the divided air 110 to the upstream of the low-pressure turbine 3L from the passage adapted to supply the high temperature high humidity air 105 to the combustor 2 from the recuperator 5.

In short, any case needs only to additionally install the branch passage which is a branch path adapted to lead a portion of the working medium increased in flow rate by the humidifier 4, the flow rate increasing means, to the low-pressure turbine 3L before supply to the combustor 2.

Second Embodiment

Figure 2:
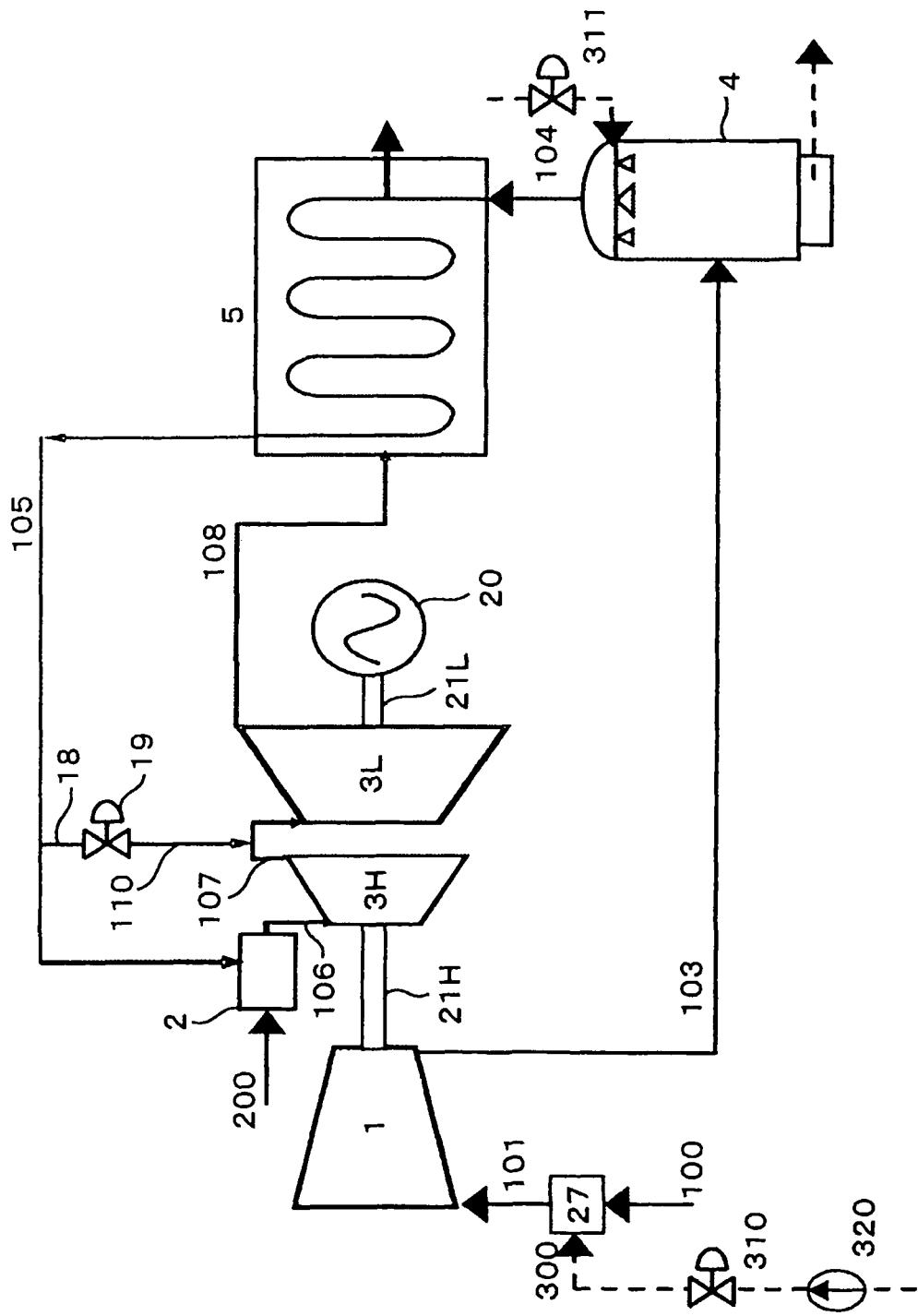
FIG. 2 is a system flow diagram illustrating a configuration of a humidity gas turbine system according to a second embodiment of the present invention.

FIG. 2 illustrates a second embodiment of the present invention, in which the exhaust gas system downstream of the recuperator 5 common to FIG. 1 is omitted.

The second embodiment of FIG. 2 is different from the first embodiment illustrated in FIG. 1 in that a water atomization cooling system 27 is provided at a suction air inlet of the compressor 1 to spray fine water drops for evaporation to lower the temperature of the working fluid in the compressor.

In the water atomization cooling system 27, atomized water 300 to be sprayed into the compressor inlet air 100 at the inlet of the compressor 1 is pressurized by a high-pressure pump 320. Then, the pressurized atomized water 300 is adjusted to a given flow rate by an atomized water volume control valve 310 and miniaturized by an atomizing nozzle in the water atomization cooling system 27. A portion of the miniaturized water drops is evaporated before sucked into the compressor to lower the temperature of the working fluid. Thus, the compressor inlet air 100 is converted into lower temperature high density suction air 101. Therefore, even if atmospheric temperature is high, the amount of compressor suction air is increased to increase the output power of the gas turbine.

The suction air cooling effect is increased with the higher atmospheric temperature. Therefore, the use of the water atomization cooling system 27 can stabilize the output power of the gas turbine against variations in atmospheric temperature throughout the year.

A portion of the miniaturized water drops that has not been evaporated before sucked into the compressor evaporates in the compressor to lower the temperature of the working fluid in the middle of compression. This allows a compression characteristic to approach isothermal compression; therefore, a compressor driving force is reduced by the well-known intermediate cooling effect. Consequently, the efficiency of the gas turbine is improved.

The effect of reducing the compressor driving force by the water atomization cooling system 27 described above is here applied to the power balance between the compressor and the high-pressure turbine, which is a question leading to the present embodiment. This produces the following effect.

As described in the first embodiment, the divided air 110 is injected into the low-pressure turbine 3L to increase the inlet pressure of the low-pressure turbine. Consequently, when the compressor and the high-pressure turbine are balanced at the rated combustion temperature, the pressure ratio is slightly increased compared with that during non-humidification. However, the water atomization cooling system 27 is used to reduce the compressor driving force by the intermediate cooling effect as described in the second embodiment. In such a case, the reduced driving force of the compressor can be made to balance with the output power lowering resulting from the slightly reduced expansion ratio of the high-pressure turbine 3H. Because of this, by slightly increasing the flow rate of the divided air, the pressure ratio can be made equivalent to that encountered at the time of non-humidification.

In this way, the design pressure of the pressure bulkhead of the compressor 1 and the combustor 2 through which high-pressure air passes, and the design pressure of the fuel supply system can be made equivalent to those of the simple cycle. This means high-pressure components and their design can be shared by the simple cycle, the recuperated cycle and the humidity gas turbine system. That is to say, the design and production cost of the high-pressure components and component management cost can be reduced.

A control method is next described in the case of the provision of the water atomization cooling system 27 described above. The amount of water supplied to the humidifier 4 is determined according to an instruction value outputted to the gas turbine. If the outputted instruction value exceeds a predetermined threshold value, humidification is started. It is necessary to increase the flow rate of the divided air 110 of the working fluid in accordance with the actual increased humidification volume (the amount of evaporation). However, the amount of water supplied to the humidifier 4 is not necessarily proportional to the actual humidification amount in terms of transient property. The amount of evaporation depends on the respective temperatures of water and compression air supplied to the humidifier 4. The greater the output power of the gas turbine is, the higher the temperatures become. However, it is not easy to learn the actual output power of the gas turbine compared with that of the generator, especially in the case of a mechanically driven application such as a pump or a screw. Therefore, to simplify the control system it is desirable to operate the branch air flow control mechanism 19 which is a flow control mechanism so as to increase the flow rate of the divided air 110 of the working fluid according to an increase in the output instruction value.

In contrast, the optimum flow rate of the divided air 110 of the working fluid is varied also depending on a variation in the flow rate of water sprayed by the water atomization cooling system 27. As described above, when the atomization amount of the water atomization cooling system 27 is increased, it is necessary to increase the flow rate of the divided air 110. The flow rate of water sprayed by the water atomization cooling system 27 is controlled by the output instruction value and by atmospheric temperature.

Thus, if the flow rate of the divided air of the working fluid is controlled based on the output instruction value of the low-pressure turbine and on the flow rate of the water sprayed by the water atomization cooling system, while also the two-shaft gas turbine enjoys the efficiency improving effect resulting from the application of the humidity gas turbine system, the driving force of the compressor and the output power of the high-pressure turbine can be balanced to stably operate the two-shaft gas turbine.

Incidentally, this control is exercised by a control unit not illustrated. This control unit controls the branch air flow control mechanism 19 which is a division adjusting mechanism, based on the low-pressure turbine 3L and on the appropriate measurements and instruction values such as atmospheric temperature.

Third Embodiment

Figure 3:
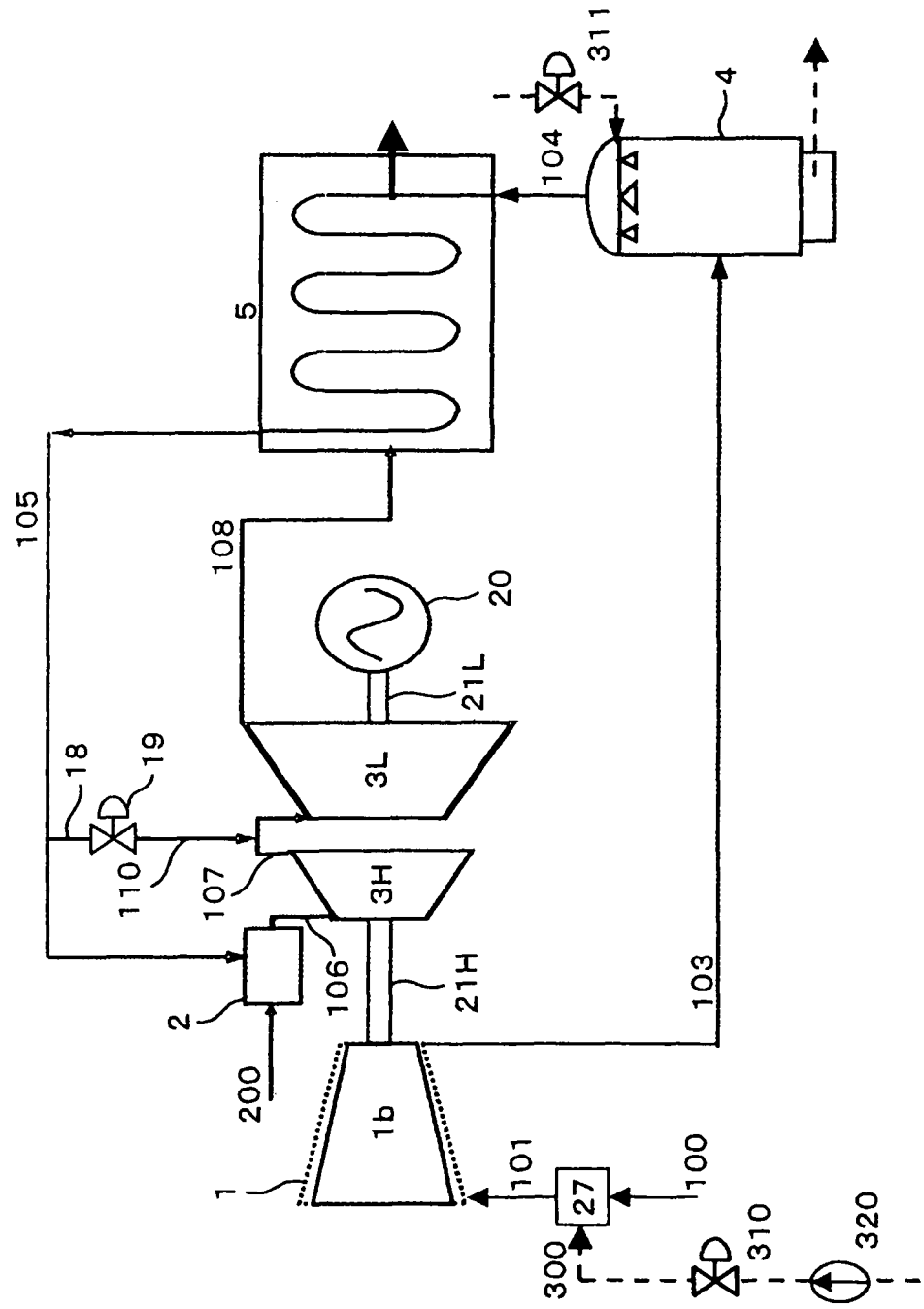
FIG. 3 is a system flow diagram illustrating a configuration of a humidity gas turbine system according to a third embodiment of the present invention.

FIG. 3 illustrates a third embodiment of the present invention, in which the exhaust gas system downstream of the recuperator 5 is omitted similarly to FIG. 2.

The third embodiment of FIG. 3 is different from the second embodiment illustrated in FIG. 2 in that a compressor 1b (a solid line) is used which is manufactured to reduce the flow rate of working fluid of the compressor 1 indicated with a dotted line in FIG. 3. The compressor of the present embodiment can easily be manufactured by the manufacturing method disclosed by e.g. JP-A-2005-155613 because parts and drawings can be shared by the gas turbine compressor 1 designed for the simple cycle illustrated in FIG. 2.

Since the compressor 1*b* of the present embodiment is manufactured to reduce the flow rate of the working fluid compared with that of the simple cycle, also the compressor driving force can be reduced.

The effect of reducing the compressor driving force according to the present embodiment is here applied to the power balance between the compressor and the high-pressure turbine, which is the question leading to the present invention. This produces the same effect as that of the second embodiment.

As described in the first embodiment, the divided air 110 is injected into the low-pressure turbine 3L to increase the inlet pressure of the low-pressure turbine. Consequently, when the compressor and the high-pressure turbine are balanced at the rated combustion temperature, the pressure ratio is slightly increased compared with that encountered during non-humidification. However, as in this embodiment, if the working fluid of the compressor is reduced to reduce the compressor driving force, the reduced driving force of the compressor can be made to balance with the output power lowering resulting from the slightly reduced expansion ratio of the high-pressure turbine 3H. In addition to this, since the reduced flow rate of the divided working fluid reduces the reduction per se of the expansion ratio of the high-pressure turbine 3H, the inlet pressure of the high-pressure turbine can be made equivalent to the design pressure of the high-pressure components such as a combustor pressure bulkhead and the fuel system compared with the case of the first embodiment.

Thus, the design pressure of the high-pressure components can be made equivalent to those of the simple cycle as with the case of the second embodiment.

In contrast, in the non-humidification state where water is not supplied to the humidifier 4, the flow rate of the working fluid flowing into the high-pressure gas turbine 3H is reduced compared with the case of the second embodiment; therefore, the compressor rotates at excessively low speeds. In such a case, the flow rate of water sprayed by the water atomization cooling system 27 described in the second embodiment is increased to reduce the compressor power, thereby establishing an output power balance.

In this way, the present invention can establish a balance between the power of the compressor and that of the high-pressure turbine also when the humidity gas turbine cycle is applied to the two-shaft gas turbine.

Fourth Embodiment

Figure 4:
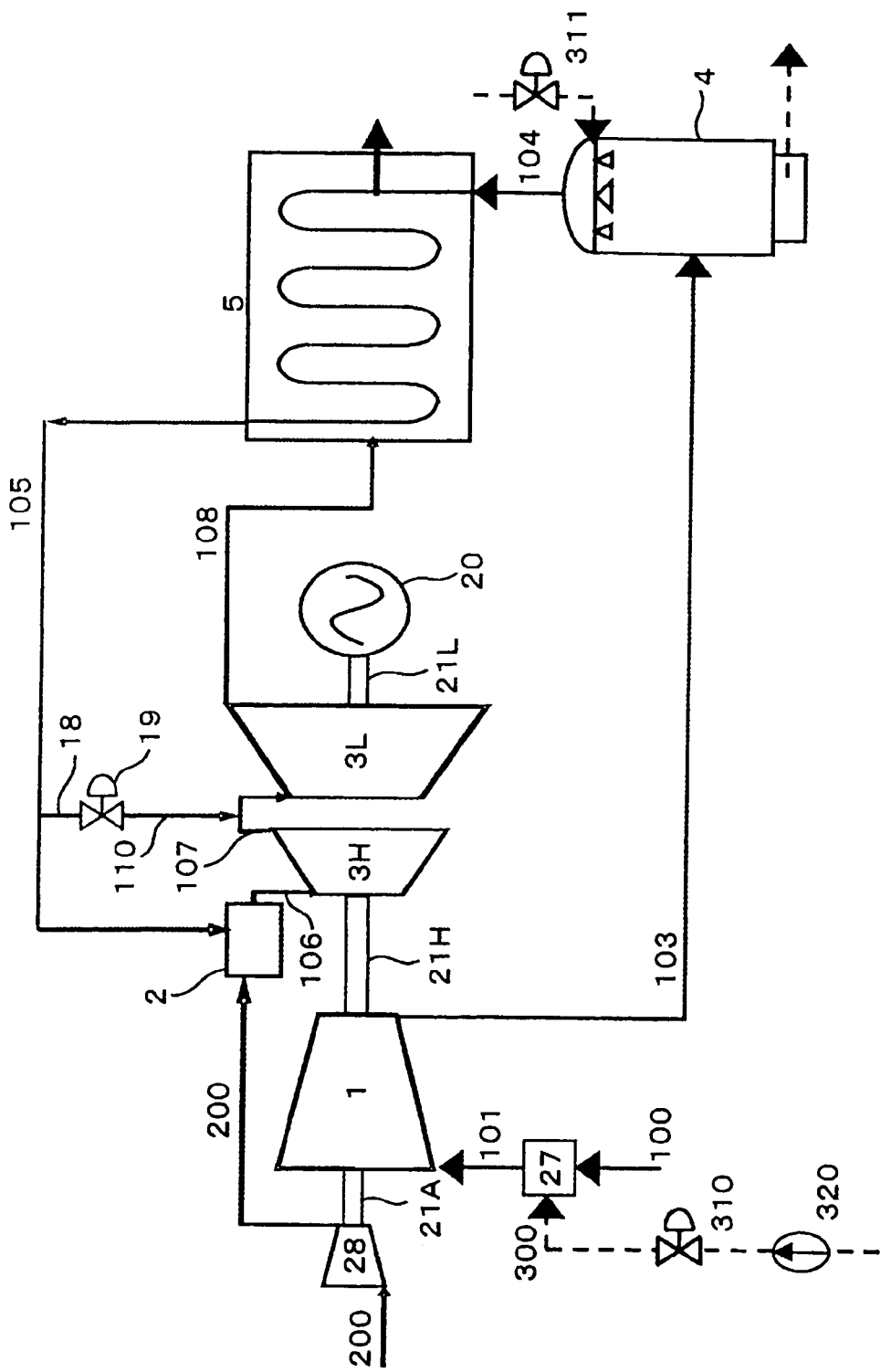
FIG. 4 is a system flow diagram illustrating a configuration of a humidity gas turbine system according to a fourth embodiment of the present invention.

FIG. 4 illustrates a fourth embodiment of the present invention, in which the exhaust gas system downstream of the recuperator 5 is omitted similarly to FIG. 2.

The fourth embodiment in FIG. 4 is different from the second embodiment illustrated in FIG. 2 in that a gas compressor 28 is coupled to the shaft end of the compressor 1 via a shaft 21A to pressurize fuel 200 of the gas turbine by the gas compressor 28.

The flow rate of water supplied to the humidifier 4 may be increased to a given flow rate of the humidity gas turbine system. In such a case, as described in the first embodiment, if the total volume of the working fluid increased by the addition of moisture flows into the high-pressure turbine 3H, the compressor 1 rotates at excessive speeds. To prevent such excessive rotation, control is exercised to reduce the flow rate of fuel supplied to the combustor. In the case where the gas compressor 28 is connected to the compressor 1 as in the present embodiment, however, the output power of the high-pressure turbine is partially consumed as the compression power of fuel gas. Therefore, the lowering of the combustion temperature is decreased compared with the case of the first embodiment to increase the efficiency of the gas turbine accordingly. In addition, even in the case of increasing the flow rate of the divided air 110 to raise the combustion temperature as with the first embodiment, the small flow rate of the divided air is required. Consequently, the branch passage 18 can be made compact to reduce cost. In addition, since the working fluid temperature at the inlet of the low-pressure turbine 3L is raised, the output power and efficiency of the low-pressure turbine 3L are increased.

In contrast, in the non-humidification state where water is not supplied to the humidifier 4, as with the case of the third embodiment, the flow rate of water sprayed by the water atomization cooling system 27 is increased to reduce the driving power of the compressor 1, thereby establishing an output power balance.

The method of pressurizing the combustion gas using the gas compressor connected to the compressor of the two-shaft gas turbine as in the present embodiment produces a significant effect because of the following. In the case where gas fuel with low calorific power or with low density is used such as coal gasification gas fuel or hydrogen-containing gas fuel, a larger gas compressor 28 can be connected.

In FIG. 4, the compressor 1 and the gas compressor 28 are directly connected to each other via the shaft 21A; however, they may be connected via reduction gears.

In the case where the gas turbine system is of oil fuel firing, even if a pressurizing pump for oil fuel is connected to the compressor, the same effect can be produced while power consumption is small compared with gas fuel. The same effect can be produced by other than fuel pressurizing machines as long as they consume the output power of the high-pressure turbine 3H.

Fifth Embodiment

Figure 5:
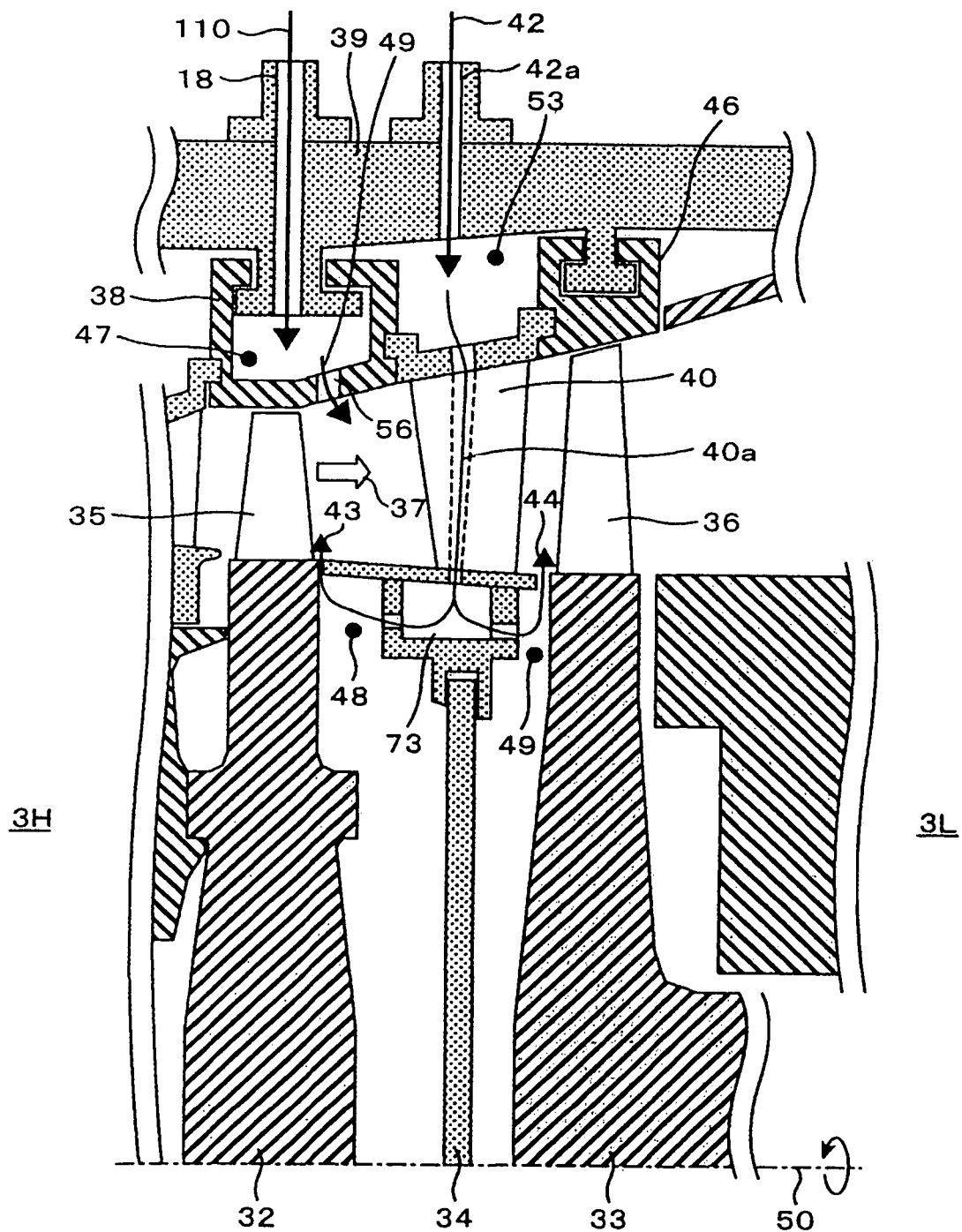
FIG. 5 is a partial cross-sectional view illustrating a divided air-supplying configuration in the vicinity of the upstream side of a low-pressure turbine in a two-shaft gas turbine according to a fifth embodiment of the present invention.

With reference to FIG. 5, according to a fifth embodiment of the invention, a description is next given of a specific configuration in the vicinity of the inlet side of the low-pressure turbine 3L to which the divided high temperature high humidity air 110 is supplied, in the two-shaft gas turbine which is applied to the humidity gas turbine system illustrated in FIG. 1 according to the first embodiment.

In the two-shaft gas turbine according to the first embodiment of the present invention illustrated in FIG. 5, the high-pressure turbine 3H and the low-pressure turbine 3L are installed in a common turbine casing 39. A final stage side rotating body constituting part of the high-pressure turbine 3H includes a high-pressure turbine rotor 32 and a plurality of final stage blades 35 of the high-pressure turbine 3H arranged on the outer circumference of the high-pressure turbine rotor 32. An initial stage side rotating body constituting part of the low-pressure turbine 3L includes a low-pressure turbine rotor 33 and a plurality of initial stage nozzles 36 of the low-pressure turbine 3L arranged on the outer circumference of the low-pressure turbine rotor 33.

The respective rotating bodies of the high-pressure turbine 3H and the low-pressure turbine 3L are configured to rotate around a central axis of rotation 50.

A stationary bulkhead 34 is installed between the high-pressure turbine 3H and the low-pressure turbine 3L so as to isolate one from the other. A high-pressure side stationary shroud 38 constituting part of the high-pressure turbine 3H and a low-pressure side stationary shroud 46 constituting part of the low-pressure turbine 3L are installed on the inner circumferential side of the turbine casing 39.

A plurality of initial stage nozzles 40 of the low-pressure turbine 3L are installed on the outer circumferential side of the bulkhead 34 so as to engage both the high-pressure side stationary shroud 38 and the low-pressure side stationary shroud 46.

The working fluid 37 driving the high-pressure turbine 3H is discharged along a gas path from the final stage blades 35 of the high-pressure turbine 3H. In the low-pressure turbine 3L installed on the downstream side of the high-pressure turbine 3H, the working fluid 37 thus discharged is introduced to recover energy, thereby obtaining rotational energy. In this way, the low-pressure turbine 3L is driven to rotate the generator 20 as a driven body connected to the low-pressure turbine 3L.

A passage space through which the working fluid 37 flows and in which the turbine nozzles and turbine blades are present is called the gas path.

The low-pressure turbine initial stage nozzle 40 constituting part of the low-pressure turbine 3L is internally formed with an air passage 40a adapted to allow purge air 42 to flow therethrough. The purge air 42 which is extracted from the middle stage of the compressor 1 and led through the air passage 42a is introduced into a cavity 53 defined inside the turbine casing 39 through the air passage 42a formed to pass through the turbine casing 39. The purge air 42 is routed through the air passage 40a of the initial nozzle 40 from the cavity 53 and introduced into a chamber 73 installed on the outer circumferential side of the bulkhead 34.

A wheel space 48 is defined on the inner circumferential side of the initial stage nozzles 40 of the low-pressure turbine 3L and between the bulkhead 34 and the end face of the high-pressure turbine rotor 32 provided with the final stage blades 35 of the high-pressure turbine 3H. A wheel space 49 is defined between the bulkhead 34 and the end face of the low-pressure turbine rotor 33 provided with the initial stage blades 36 of the low-pressure turbine 3L.

The purge air 42 introduced into the chamber 73 flows into the wheel spaces 48, 49 through corresponding holes formed in the wall of the chamber 73. Thereafter, the purge air 42 is divided into purge air 43 and purge air 44. Specifically, the purge air 43 passes through a gap between the outer circumferential end lateral surface of the high-pressure turbine rotor 32 and a wall surface partitioning the chamber 73 from the gas path and flows into the gas path. The purge air 44 passes through a gap between the outer circumferential end lateral surface of the low-pressure turbine rotor 33 and the wall surface partitioning the chamber 73 from the gas path and flows into the gas path.

The pressure of the purge air 43, 44 is set at a level higher than the working fluid 37 by increasing the air pressure of the purge air 42. This prevents the high-pressure turbine rotor 32 and the low-pressure turbine rotor 33 from being damaged by the high temperature working fluid 37 that would otherwise flow into the wheel spaces 48, 49.

A cavity 47 is defined inside the high-pressure side stationary shroud 38 installed on the inner circumferential side of the turbine casing 39. The high temperature high humidity air 110 is divided from the high temperature high humidity air 105 supplied from the recuperator 5. The high temperature high humidity air 110 flows through the branch passage 18 disposed to pass through the turbine casing 39, and is introduced into the cavity 47 formed inside the high-pressure side stationary shroud 38 installed in the turbine casing 39. The divided air 110 is supplied to the gas path through a divided air supply hole 56 provided in a wall face of the high-pressure side stationary shroud 38 and merges with the combustion gas of the working fluid 37.

In the two-shaft gas turbine of the present embodiment, the high temperature high humidity air 110 is introduced from the outside of the turbine casing 39 through the branch passage 18 passing through the turbine casing 39, into the cavity 47 defined inside the high-pressure side stationary shroud 38, the high temperature high humidity air 110 being divided from the high temperature high humidity air 105 supplied from the recuperator 5 in the humidity gas turbine system illustrated in FIG. 1.

A method is conceivable of introducing the divided air 110 through a pipe such as the branch passage 18 illustrated in FIG. 5.

The high temperature high humidity air 110 flowing into the cavity 47 inside the high-pressure side stationary shroud 38 is supplied to the gas path through a plurality of the divided air supply holes 56 circumferentially provided in the wall surface, of the high-pressure side stationary shroud 38, opposed to the gas path, and merges with the working fluid 37 flowing in the gas path.

In ordinary gas turbines, not only a heat-resistant material is used as a material for the high-pressure side stationary shroud 38 but also cooling air is allowed to flow along and cool the high-pressure side stationary shroud 38.

As regards cooling air, compressed air is extracted from the middle or final stage of the compressor 1 to the outside and the compressed air thus extracted is supplied through pipes to the portions of an external cylinder needed to be cooled. In this way, the extracted compressor air is often used as cooling air. However, the flow rate of the cooling air is increased to significantly reduce the efficiency of the gas turbine. Therefore, the mass flow rate of the cooling air is designed to be not higher than 10% of the inlet mass flow rate of the compressor inlet air 100 sucked by the compressor 1.

In the two-shaft gas turbine of the present embodiment, as described above, the divided high temperature high humidity air 110 supplied from the inlet side of the low-pressure turbine 3L is allowed to flow into the cavity 47 in the high-pressure side stationary shroud 38 through the branch passage 18 disposed to pass through the turbine casing 39 and supplied to the gas path. The mass flow rate of the divided high temperature high humidity air 110 is 10-25% of the compressor inlet flow rate.

This produces an effect of cooling the high-pressure side stationary shroud 38 by the flow of the divided high temperature high humidity air 110. For this reason, it is not necessary to additionally provide a cooling air system adapted to supply air for cooling the high-pressure side stationary shroud 38.

The high temperature high humidity air 110 has a mass flow rate greater than an amount of cooling air used for cooling in the ordinary gas turbine. Therefore, a high cooling effect can be anticipated so that a low-end material with low heatproof temperature can be used for the material of the high-pressure side stationary shroud. Thus, production cost can be reduced.

In addition, the cavity 47 is provided inside the high-pressure side stationary shroud 38 to introduce the divided air 110 thereinto. The divided air 110 is supplied from the cavity 47 to the gas path through the divided air supply holes 56 formed in the circumferential direction. Therefore, with circumferential deviation reduced, the divided high temperature high humidity air 110 and the working fluid 37 can be allowed to merge with each other in the gas path. Thus, a mixing loss can be reduced.

Further, the temperature of the working fluid 37 on the outer circumferential side of the gas path by supplying the high temperature high humidity air 110 from the outer circumferential side of the gas path. Consequently, it is possible to prevent the gas path outer circumferential side-facing portions of the initial stage nozzles 40 and initial stage blades 36 of the low-pressure turbine 3L from being damaged by the heat of the high temperature working fluid 37.

As clear from the above-description, according to the two-shaft gas turbine of the present embodiment, in the case where the humidity gas turbine system is applied to the two-shaft gas turbine, the driving force of the compressor and the output power of the high-pressure turbine are balanced to stably operate the two-shaft gas turbine and to be able to prevent the compressor from rotating at excessive speeds and at excessively low speeds. Thus, the blade vibrations and shaft vibrations of rotary components can be enhanced in reliability.

The turbine inlet temperature can be maintained at a level anticipated in the simple cycle. Thus, also the two-shaft gas turbine can enjoy the efficiency improving effect of the gas turbine resulting from the application of the humidity gas turbine system.

In the present embodiment, both the high-pressure turbine and the low-pressure turbine can be shared by the simple cycle and the humidity gas turbine system. It is possible, therefore, to reduce development and production cost and parts management cost for turbine blades which is hot parts.

In the present embodiment, the divided air is allowed to flow into the cavity inside the high-pressure side stationary shroud. Thus, the effect of cooling the high-pressure side stationary shroud by the divided air can be anticipated. It is not necessary to additionally provide a cooling air system adapted to supply air for cooling the high-pressure side stationary shroud.

In the present embodiment, the divided air has a mass flow rate greater than the amount of cooling air used for cooling in the ordinary gas turbine. Therefore, a high cooling effect can be anticipated so that a low-end material with low heatproof temperature can be adopted for the material of the high-pressure side stationary shroud. Thus, production cost can be reduced.

In the present embodiment, the divided air is supplied to the outer or inner circumferential side of the gas path at the low-pressure turbine inlet. Therefore, the divided air thus supplied can lower the temperature on the outer or inner circumferential side of the turbine blades and nozzles located in the gas path to prevent damage to the blades and nozzles that would otherwise result from the high-temperature gas. Thus, the reliability of the products can be enhanced.

In short, according to the present embodiment, when the humidity gas turbine cycle is applied to the two-shaft gas turbine, the efficiency of the gas turbine can be improved and the driving force of the compressor and the output power of the high-pressure turbine can be balanced to stably operate the gas turbine. Thus, the two-shaft gas turbine enhanced in reliability can be achieved.

Sixth Embodiment

Figure 6:
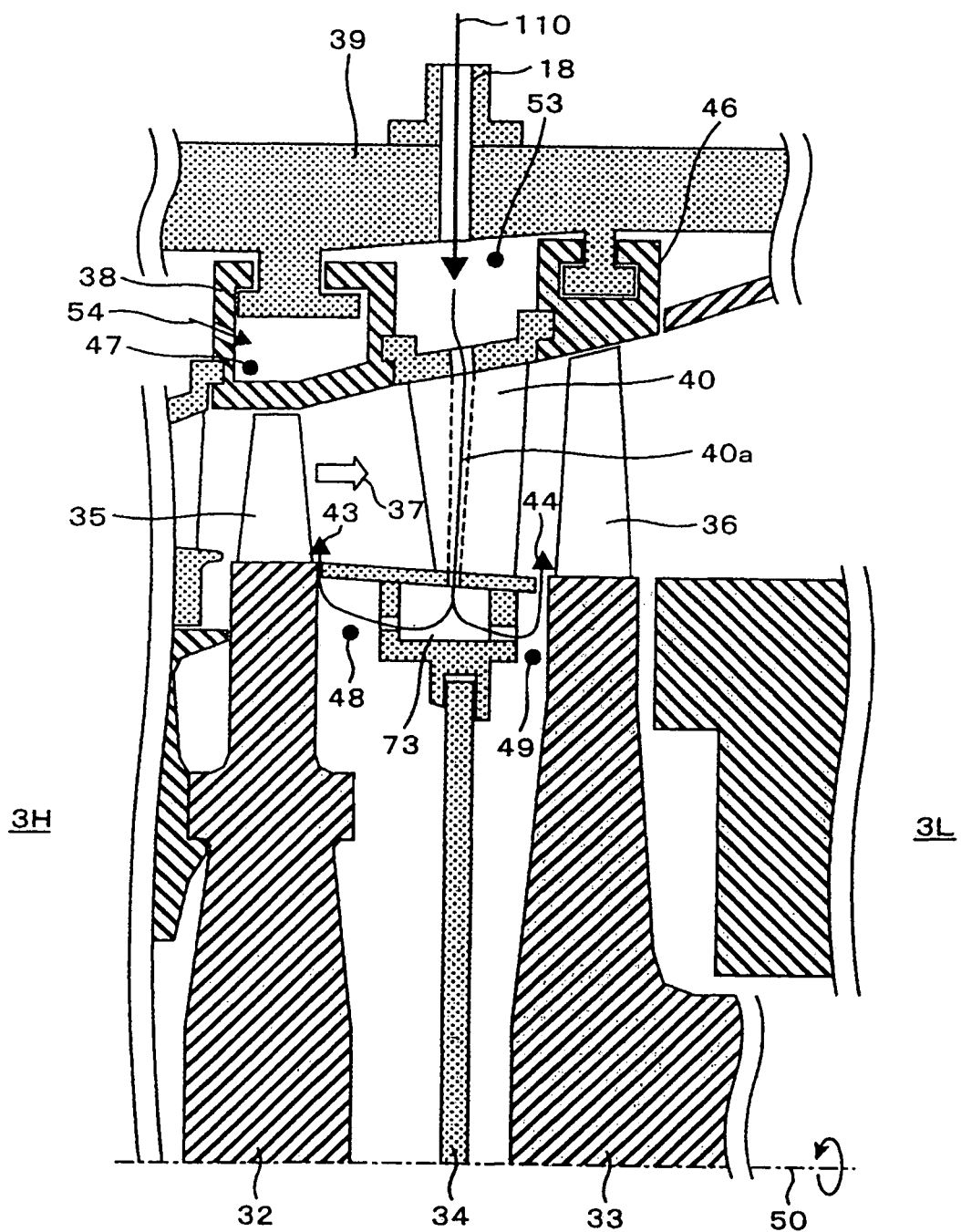
FIG. 6 is a partial cross-sectional view illustrating a divided air-supplying configuration in the vicinity of the upstream side of a low-pressure turbine in a two-shaft gas turbine according to a sixth embodiment of the present invention.

A description is next given of a two-shaft gas turbine system according to a sixth embodiment where the present invention is applied to the humidity gas turbine system with reference to FIG. 6.

FIG. 6 illustrates a configuration in the vicinity of an inlet side of a low-pressure turbine 3L to which divided high temperature high humidity air is supplied, in the two-shaft gas turbine provided in the humidity gas turbine system according to the sixth embodiment of the present invention. Since the basic configuration of FIG. 6 is similar to that of the two-shaft gas turbine of the fifth embodiment illustrated in FIG. 5, the explanation of the configuration common to the fifth embodiment is omitted but only a different configuration is described below.

Referring to FIG. 6, the present embodiment is configured such that the divided high temperature high humidity air 110 (hereinafter also abbreviated as the divided air 110) is introduced into the cavity 53 defined between the outer circumferential side of the initial stage nozzle 40 of the low-pressure turbine 3L installed in the turbine casing 39 and the inner wall side of the turbine casing 39 through the branch passage 18 disposed to pass through the turbine casing 39.

The divided air 110 introduced into the cavity 53 through the branch passage 18 flows along the air passage 40a formed inside the initial stage nozzle 40 of the low-pressure turbine 3L to cool the initial stage nozzle 40 and is introduced into the chamber 73 installed on the outer circumferential side of the bulkhead 34.

The divided air 110 introduced into the chamber 73 is allowed to flow into the wheel spaces 48, 49 from the corresponding holes formed in the wall of the chamber 73. Thereafter, the divided air 110 is further divided into purge air 43 and purge air 44. Specifically, the purge air 43 passes through the gap between the outer circumferential end lateral surface of the high-pressure turbine rotor 32 and the wall surface partitioning the chamber 73 from the gas path and flows into the gas path. The purge air 44 passes through the gap between the outer circumferential end lateral surface of the low-pressure turbine rotor 33 and the wall surface partitioning the chamber 73 from the gas path and flows into the gas path.

Unlike the fifth embodiment, the divided air 110 is not supplied to the cavity 47 in the high-pressure side stationary shroud 38 in this embodiment. Therefore, it is necessary to separately supply cooling air into the cavity 47 defined in the high-pressure side stationary shroud 38 to cool the high-pressure side stationary shroud 38.

To meet the necessity, the following configuration is adopted: A cooling air supply hole 54 is provided in the upstream side wall surface of the high-pressure side stationary shroud 38. The separately introduced cooling air is supplied into the cavity 47 through the cooling air supply hole 54 to cool the high-pressure side stationary shroud 38.

Incidentally, also other than the provision of the cooling air supply hole 54, a method is conceivable of cooling the high-pressure side stationary shroud 38 through piping adapted to lead cooling air from the outer circumferential side of the turbine casing 39.

In the present embodiment, the divided air 110 introduced through the branch passage 18 formed to pass through the turbine casing 39 is introduced into the wheel spaces 48, 49 via the cavity 53 defined on the outer circumferential side of the initial stage nozzles 40, via the air passage 40a in the low-pressure turbine initial stage nozzles 40, and via the chamber 73 installed on the outer circumferential side of the bulkhead 34, and then allowed to flow as the purge air 43, 44 into the gas path. Therefore, the temperature of the wheel spaces 48, 49 can be limited to a low level to thereby limit the respective temperatures of the high-pressure turbine rotor 32 and the low-pressure turbine rotor 33 to a low level.

Consequently, a low-end material with low heatproof temperature can be used for the material of the high-pressure turbine rotor 32 and of the low-pressure turbine rotor 33. Thus, the production cost of the gas turbine can be reduced.

Further, since the divided high temperature high humidity air 110 is introduced into the wheel spaces 48, 49 and allowed to flow toward the inner circumferential side of the gas path, the temperature of the working fluid 37 on the inner circumferential side of the gas path can be lowered. Thus, it is possible to prevent damage resulting from the heat of the high-temperature working fluid 37 from occurring at the gas path inner circumferential side portion of the initial stage nozzles 40 and initial stage blade 36 of the low-pressure turbine 3L.

According to the present embodiment, when the humidity gas turbine cycle is applied to the two-shaft gas turbine, the efficiency of the gas turbine can be improved and the driving force of the compressor and the output power of the high-pressure turbine can be balanced to stably operate the gas turbine. Thus, the two-shaft gas turbine enhanced in reliability can be achieved.

Seventh Embodiment

Figure 7:
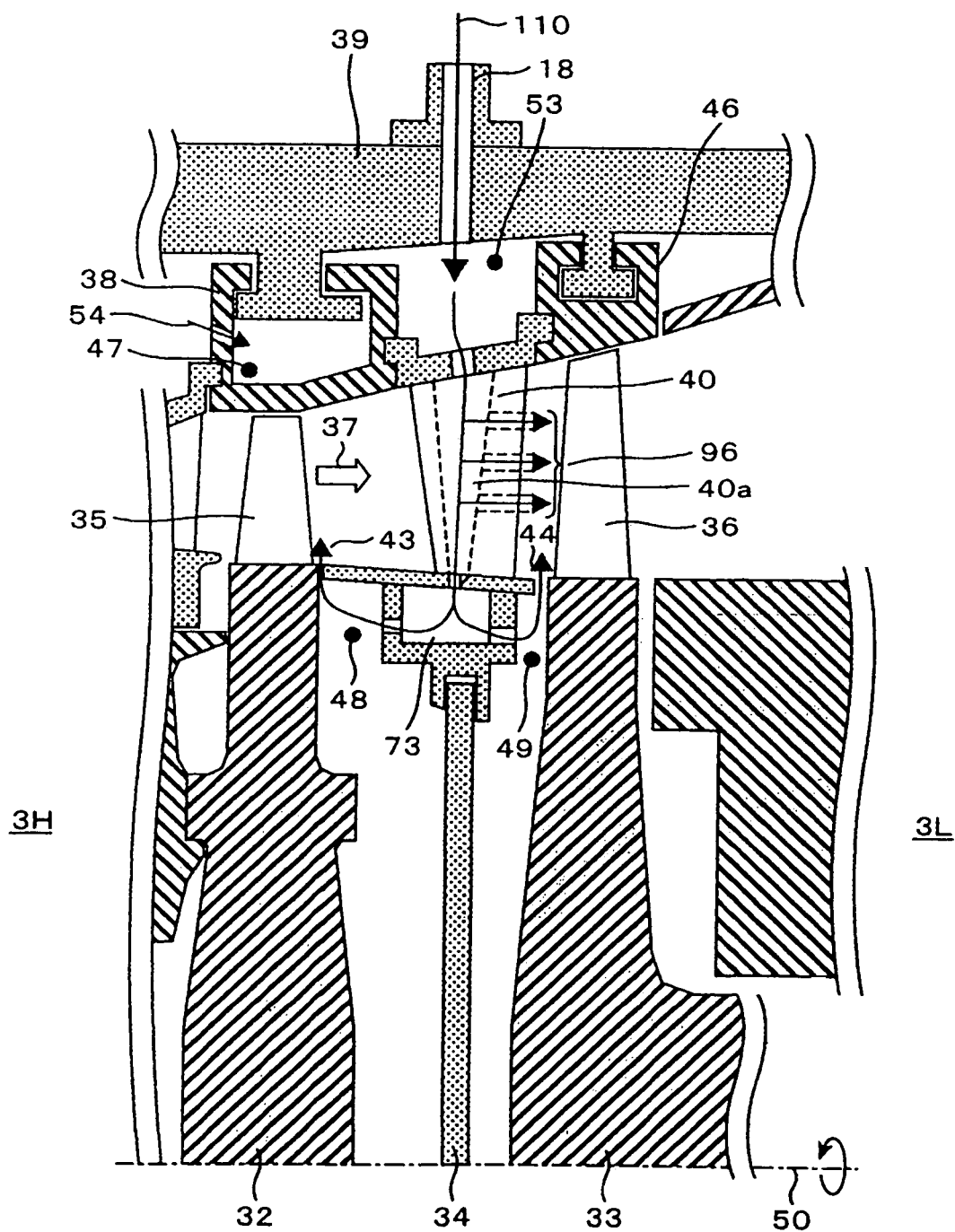
FIG. 7 is a partial cross-sectional view illustrating a divided air-supplying configuration in the vicinity of the upstream side of a low-pressure turbine in a two-shaft gas turbine according to a seventh embodiment of the present invention.

A description is next given of a two-shaft gas turbine system according to a seventh embodiment where the present invention is applied to the humidity gas turbine system with reference to FIG. 7.

FIG. 7 illustrates a configuration in the vicinity of an inlet side of a low-pressure turbine 3L to which divided air is supplied, in a two-shaft gas turbine provided in the humidity gas turbine system according to the seventh embodiment of the present invention. Since the basic configuration of FIG. 7 is similar to that of the two-shaft gas turbine of the sixth embodiment illustrated in FIG. 6, the explanation of the configuration common to the sixth embodiment is omitted but only a different configuration is described below.

Referring to FIG. 7, the two-shaft gas turbine of the present embodiment is configured such that the divided high temperature high humidity air 110 (hereinafter also abbreviated as the divided air 110) is introduced into the cavity 53 defined between the outer circumferential side of the initial stage nozzle 40 of the low-pressure turbine 3L installed in the turbine casing 39 and the inner wall side of the turbine casing 39, through the branch passage 18 disposed to pass through the turbine casing 39.

The divided air 110 introduced into the cavity 53 through the branch passage 18 flows along the air passage 40a formed inside the initial stage nozzle 40 of the low-pressure turbine 3L to cool the initial stage nozzle 40. In the initial stage nozzle 40, the air passage 40a is branched into a plurality of branch air passages 96. A portion of the divided air 110 is jetted out from the exhaust nozzles of the branch air passages 96 opening at the trailing edge of the initial stage nozzle 40, into the gas path so as to merge with the working fluid or medium 37.

A large portion of the divided high temperature high humidity air 110 flows along the air passage 40a of the initial stage nozzle 40 to cool the initial stage nozzle 40 and is introduced into the wheel spaces 48, 49 via the cavity 53 defined on the outer circumferential side of the initial stage nozzle 40, via the air passage 40a in the low-pressure turbine initial stage nozzle 40, and via the chamber 73 installed on the outer circumferential side of the bulkhead 34. Thereafter, the high temperature high humidity air flows into the gas path as purge air 43, 44.

Figure 8A:
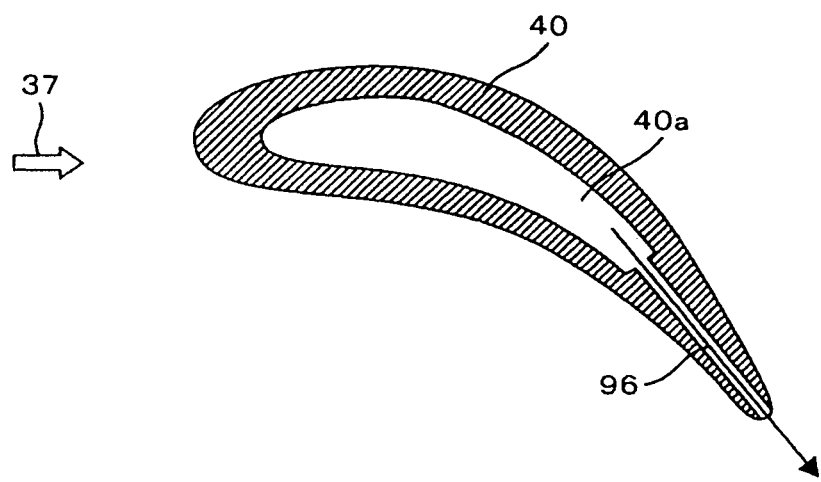
FIGS. 8A and 8B are cross-sectional views of initial stage blades installed in the low-pressure turbine of the two-shaft gas turbine according to the seventh embodiment of the present invention.
Figure 8B:
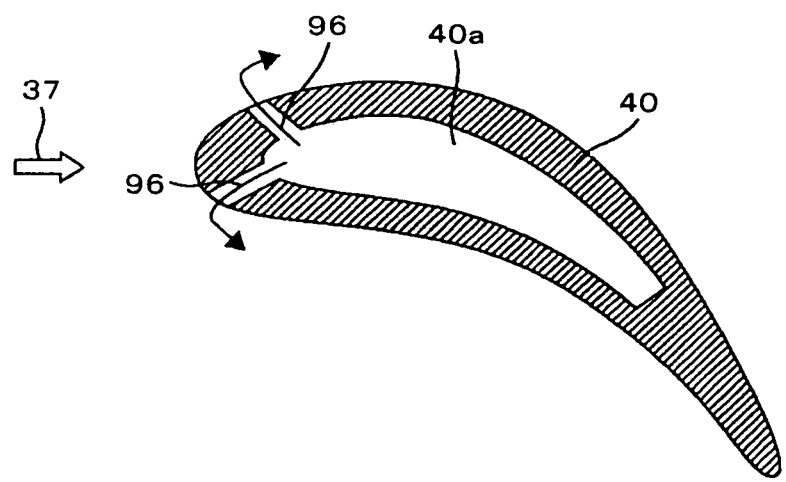

FIGS. 8A and 8B are cross-sectional views of the initial stage nozzle 40 of the low-pressure turbine 3L illustrated in FIG. 7.

The branch air passages 96 branched from the air passage 40a defined inside the initial stage nozzle 40 communicates with the working fluid at the gas path. An arrow 37 of FIG. 7 indicates the flowing direction of the working fluid.

The exhaust nozzle of the branch air passage 96 may be achieved by adopting any one of the following methods: First, the exhaust nozzle is opened to allow a portion of the divided high temperature high humidity air 110 to flow into the gas path from the trailing end of the initial stage nozzle 40 as illustrated in FIG. 8A; second, the exhaust nozzles are opened so as to allow a portion of the divided air 110 to flow into the gas path from a portion close to the leading edge of the initial stage nozzle 40 as illustrated in FIG. 8B; third, the configurations illustrated in FIGS. 8A and 8B are combined.

The two-shaft gas-turbine of the present embodiment illustrated in FIG. 7 can enjoy the function and effect of the two-shaft gas turbine of the sixth embodiment illustrated in FIG. 6. In addition, it can further enjoy a new function and effect as described below.

Specifically, in the two-shaft gas turbine of the present embodiment, a portion of the divided high temperature high humidity air 110 introduced into the air passage 40a inside the initial stage nozzle 40 is divided into first and second flows. The first flow passes through the branch air passage 96 defined in the initial stage nozzle 40 and is led into the gas path. The second flow is routed from the air passage 40a through the chamber 73 installed on the outer circumferential side of the bulkhead 34 and is led into the gas path as the purge air 43, 44. Therefore, the flow rate of the purge air 43, 44 is smaller than that in the two-shaft gas turbine of the second embodiment illustrated in FIG. 3 by the flow rate of the air flowing from the branch air passages 96 into the gas path.

In this way, a mixing loss can be reduced which would otherwise result from the flow of the working fluid 37 subjected to turbulence when the purge air 43, 44 in the present embodiment merges with the working fluid 37 flowing into the gas path.

Further, as illustrated in FIG. 8A, a portion of the divided high temperature high humidity air 110 is allowed to flow through the branch air passage 96 defined inside the initial stage nozzle 40 from the trailing end of the initial stage nozzle 40 in the nozzle-downstream direction close to the flowing direction of the working fluid 37. Thus, a mixing loss can be reduced which may otherwise result from the mixing of the working fluid 37 with a portion of the divided high temperature high humidity air 110.

In addition, a portion of the divided high temperature high humidity air 110 is allowed to flow in the nozzle-downstream direction from the vicinity of the leading edge of the initial stage nozzle 40 through the branch air passages 96 formed inside the initial stage nozzle 40. Thus, an effect can be increased of cooling the vicinity of the leading edge of the initial stage nozzle 40 of the low-pressure turbine 3L.

According to the present embodiment, when the humidity gas turbine cycle is applied to the two-shaft gas turbine, the efficiency of the gas turbine can be improved and the driving force of the compressor and the output power of the high-pressure turbine can be balanced to stably operate the gas turbine. Thus, the two-shaft gas turbine enhanced in reliability can be achieved.

Eighth Embodiment

Figure 9:
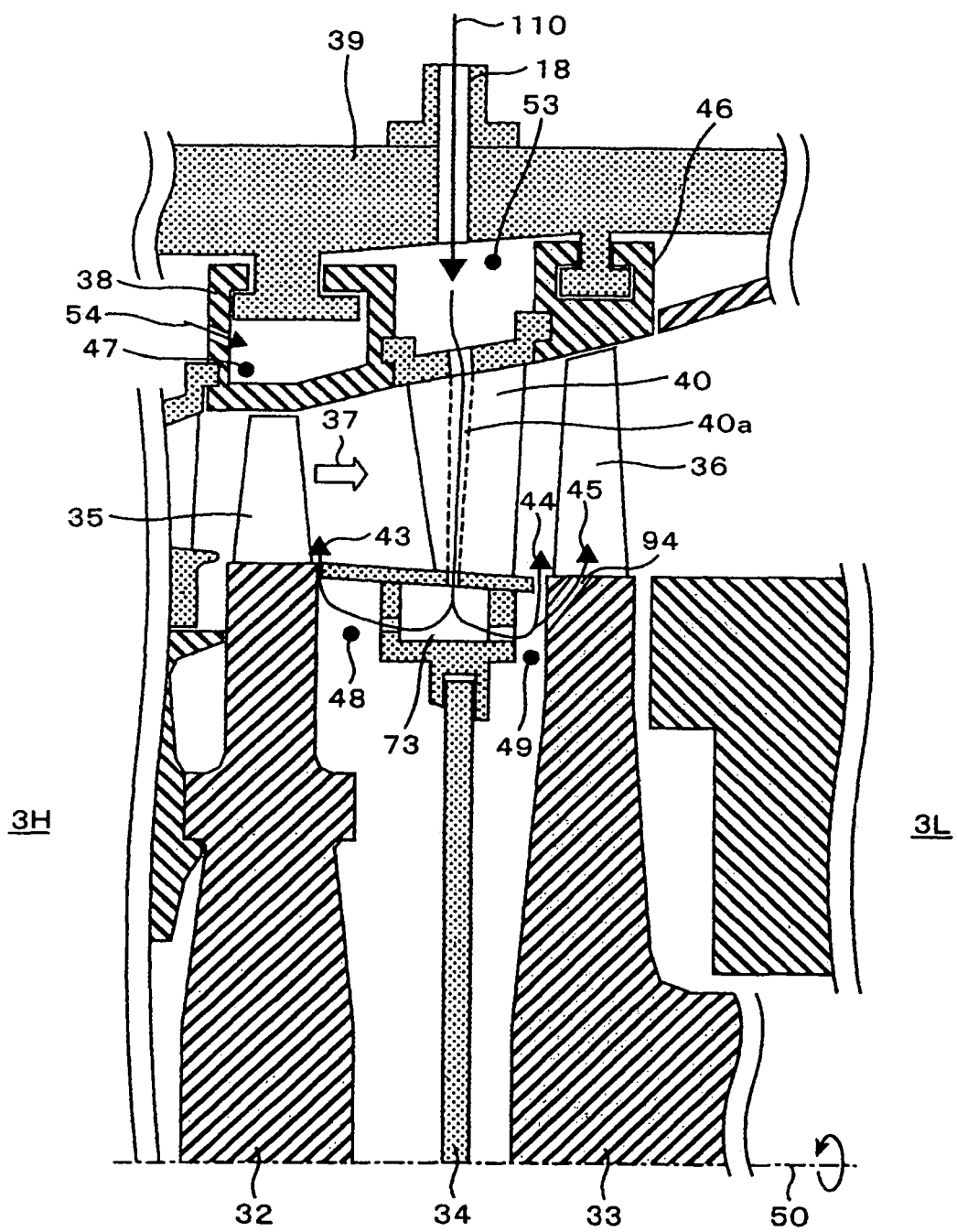
FIG. 9 is a partial cross-sectional view illustrating a divided air-supplying configuration in the vicinity of the upstream side of a low-pressure turbine in a two-shaft gas turbine according to an eighth embodiment of the present invention.

A description is next given of a two-shaft gas turbine according to an eighth embodiment where the present invention is applied to the humidity gas turbine system with reference to FIG. 9.

FIG. 9 illustrates a configuration in the vicinity of an inlet side of a low-pressure turbine 3L to which divided air is supplied, in the two-shaft gas turbine provided in the humidity gas turbine system according to the eighth embodiment of the present invention. Since the basic configuration of FIG. 9 is similar to that of the two-shaft gas turbine of the sixth embodiment illustrated in FIG. 6, the explanation of the configuration common to the sixth embodiment is omitted but only a different configuration is described below.

Referring to FIG. 9, in the two-shaft gas turbine of the present embodiment, the divided high temperature high humidity air 110 (hereinafter also abbreviated as the divided air 110) is introduced into the cavity 53 defined between the outer circumferential side of the initial stage nozzle 40 of the low-pressure turbine 3L installed in the turbine casing 39 and the inner wall side of the turbine casing 39 through the branch passage 18 disposed to pass through the turbine casing 39. The divided air 110 flows along the air passage 40a formed inside the initial stage nozzle 40 and is introduced into the wheel spaces 48, 49 via the chamber 73 installed on the outer circumferential side of the bulkhead 34. Thereafter, the divided air 110 flows, as the purge air 43, 44, into the gas path and then merges with the combustion gas of the working fluid 37.

In the present embodiment, the low-pressure turbine rotor 33 is internally formed with an air passage 94 adapted to allow the wheel space 49 to communicate with the gas path at the root of the initial stage blade 36. A portion of the purge air 44 flowing into the wheel space 49 is supplied as divided purge air 45 to the gas path from the root side of the initial stage blade 36 through the air passage 94 of the low-pressure turbine rotor 33 to cool the initial stage blade 36.

In the present embodiment, the divided purge air 45 is supplied to the initial stage blade 36 through the air passage 94 to cool the initial stage blade 36 of the low-pressure turbine 3L, thereby limiting the metal temperature of the initial stage blade 36 to a low level. Thus, the reliability of the gas turbine is enhanced.

Since the metal temperature of the initial stage blade 36 of the low-pressure turbine 3L is lowered, a low-end material with low heatproof temperature can be adopted for the initial stage blade 36. Thus, the production cost of the gas turbine can be reduced.

Further, the divided purge air 45 as a portion of the high temperature high humidity air 110 is supplied as cooling air through the air passage 94 to the initial stage blade 36 of the low-pressure turbine 3L for cooling. Therefore, the combustion temperature in the combustor of the gas turbine can be raised to thereby increase the output power of the gas turbine and improve the thermal efficiency thereof.

According to the present embodiment, when the humidity gas turbine cycle is applied to the two-shaft gas turbine, the efficiency of the gas turbine can be improved and the driving force of the compressor and the output power of the high-pressure turbine can be balanced to stably operate the gas turbine. Thus, the two-shaft gas turbine enhanced in reliability can be achieved.

Ninth Embodiment

Figure 10:
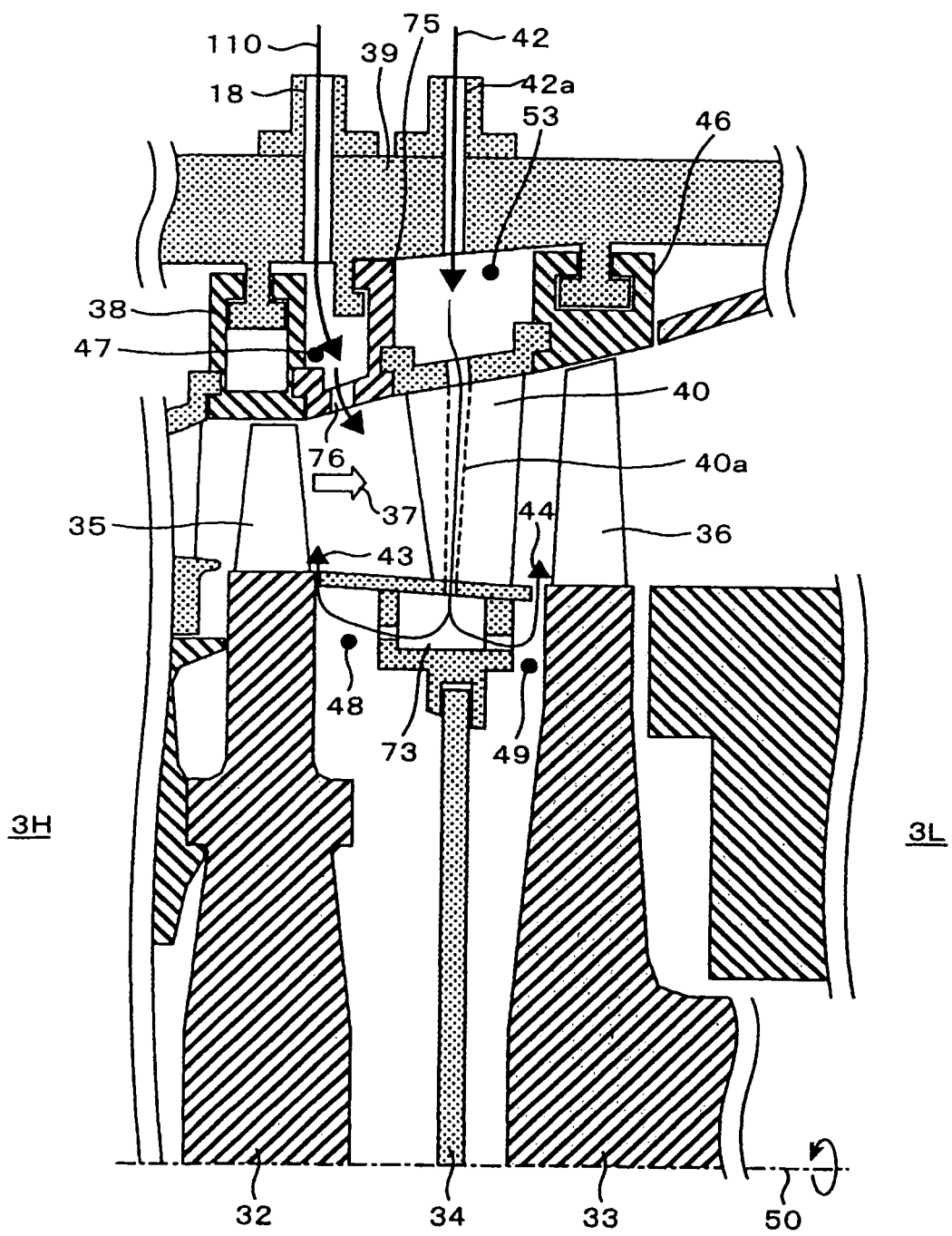
FIG. 10 is a partial cross-sectional view illustrating a divided air-supplying configuration in the vicinity of the upstream side of a low-pressure turbine in a two-shaft gas turbine according to a ninth embodiment of the present invention.

A description is next given of a two-shaft gas turbine according to a ninth embodiment where the present invention is applied to the humidity gas turbine system with reference to FIG. 10.

FIG. 10 illustrates a configuration in the vicinity of an inlet side of a low-pressure turbine 3L to which divided air is supplied, in a two-shaft gas turbine provided in the humidity gas turbine system according to the ninth embodiment of the present invention. Since the basic configuration of FIG. 10 is similar to that of the two-shaft gas turbine of the sixth embodiment illustrated in FIG. 6, the explanation of the configuration common to the sixth embodiment is omitted but only a different configuration is described below.

Referring to FIG. 10, the two-shaft gas turbine of the present embodiment includes an intermediate stationary shroud 75 installed in the turbine casing 39 at a position rearward of the high-pressure side stationary shroud 38 provided on the outer circumferential side of the final stage blade 35 of the high-pressure turbine 3H and between the high-pressure side stationary shroud 38 and the cavity 53 so as to communicate with the gas path.

A cavity 74 is defined inside the intermediate stationary shroud 75. One or more branch air supply holes 76 are formed in the wall surface of the cavity 74 opposed to the gas path.

The high temperature high humidity air 110 divided from the high temperature high humidity air 105 supplied from the recuperator 5 is introduced into the cavity 74 inside the intermediate stationary shroud 75 through the branch passage 18 disposed to pass through the turbine casing 39. This divided high temperature high humidity air 110 is supplied to the gas path through the branch air supply holes 76, merging with the combustion gas of the working fluid 37.

The purge air 42 extracted from the middle stage of the compressor 1 and led through the air passage 42a is introduced through the air passage 42a disposed to pass through the turbine casing 39, into the cavity 53 defined between the outer circumferential side of the initial stage nozzle 40 of the low-pressure turbine 3L installed in the turbine casing 39 and the inner wall side of the turbine casing 39. The purge air 42 in the cavity 53 is allowed to flow along the air passage 40a defined in the initial stage nozzle 40 and is introduced into the wheel spaces 48, 49 via the chamber 73 installed on the outer circumferential side of the bulkhead 34. Thereafter, the purge air 42 is allowed to flow as the purge air 43, 44 into the gas path, merging with the combustion gas of the working fluid 37.

In the present embodiment, the final stage blade 35 of the high-pressure turbine 3H is located on the inner circumferential side of the high-pressure side stationary shroud 38. Therefore, a pressure difference is large between the front side and rear side of the final stage blade 35. Thus, the high-pressure side stationary shroud 71 will produce large stress due to the load resulting from the pressure difference.

However, a turbine blade does not exist on the inner circumferential side of the intermediate shroud 75 installed on the downstream side of the high-pressure side stationary shroud 38. Therefore, a pressure difference is small between the front side and rear side of the intermediate shroud 75. Thus, the intermediate shroud 75 will not produce large stress.

Consequently, even if the wall surface of the intermediate shroud 75 is provided with the branch air supply holes 76 adapted to supply to the gas path the high temperature high humidity air 110 led to the cavity 74 through the air passage 18, only small stress is applied to the intermediate shroud 75. Thus, maximum stress resulting from stress concentration can be limited to a low level so that the reliability of the gas turbine can be enhanced.

According to the present embodiment, when the humidity gas turbine cycle is applied to the two-shaft gas turbine, the efficiency of the gas turbine can be improved and the driving force of the compressor and the output power of the high-pressure turbine can be balanced to stably operate the gas turbine. Thus, the two-shaft gas turbine enhanced in reliability can be achieved.

Tenth Embodiment

Figure 11:
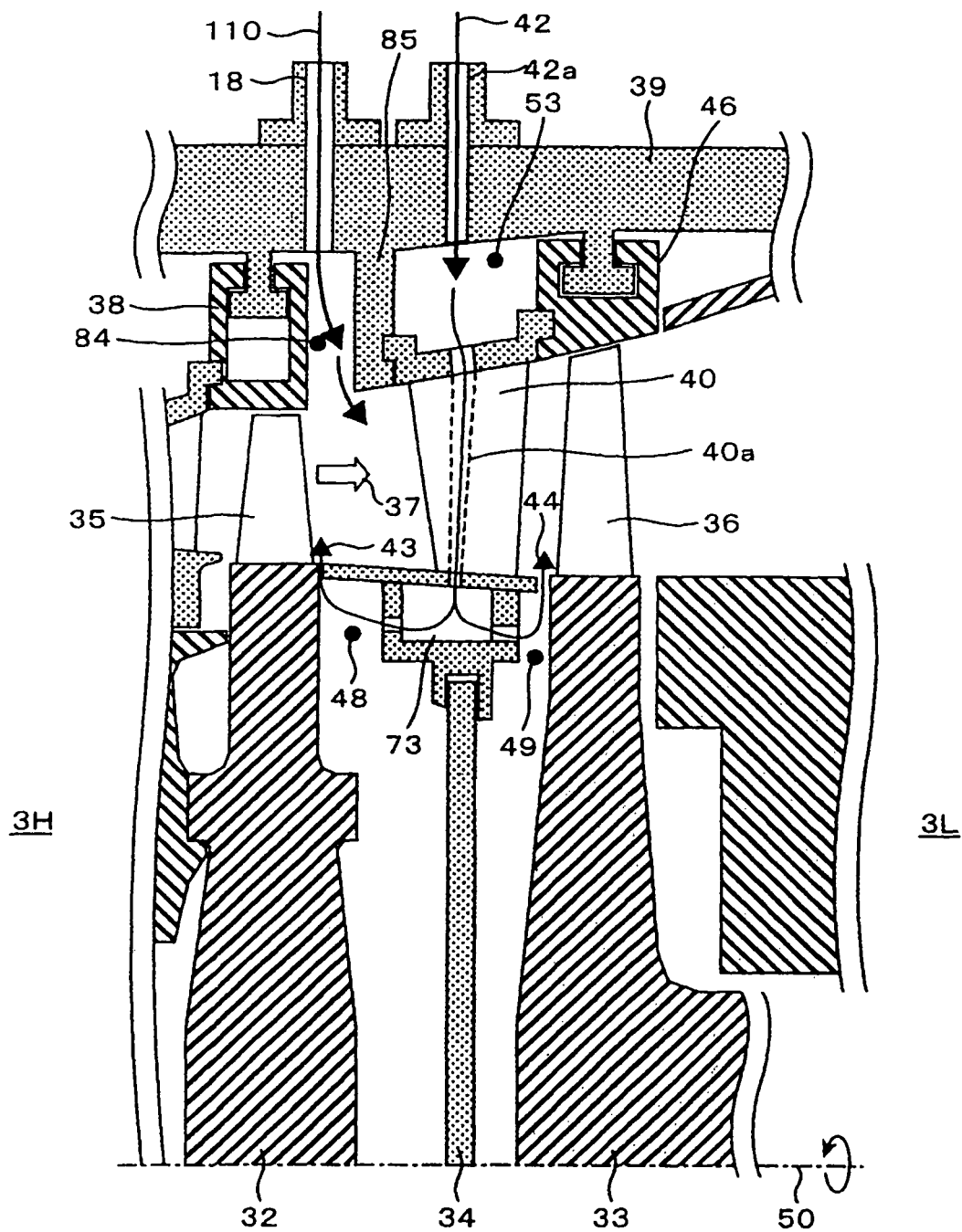
FIG. 11 is a partial cross-sectional view illustrating a divided air-supplying configuration in the vicinity of the upstream side of a low-pressure turbine in a two-shaft gas turbine according to a tenth embodiment of the present invention.

A description is next given of a two-shaft gas turbine according to a tenth embodiment where the present invention is applied to the humidity gas turbine system with reference to FIG. 11.

FIG. 11 illustrates a configuration in the vicinity of an inlet side of a low-pressure turbine 3L to which divided air is supplied, in a two-shaft gas turbine provided in the humidity gas turbine system according to the tenth embodiment of the present invention. Since the basic configuration of FIG. 11 is similar to that of the two-shaft gas turbine of the ninth embodiment illustrated in FIG. 10, the explanation of the configuration common to the ninth embodiment is omitted but only a different configuration is described below.

Referring to FIG. 11, the two-shaft gas turbine of the present embodiment is configured to form a cavity 84 communicating with the gas path at a position, in the turbine casing 39, on the downstream side of the high-pressure side stationary shroud 38 provided on the outer circumferential side of the final stage rotor 35 of the high-pressure turbine 3H, and on the upstream side of a casing wall member 85 partitioning the cavity 53.

The communicating portion of the cavity 84 with the gas path is formed as a circumferentially continuous space.

In the present embodiment, the high temperature high humidity air 110 is introduced into the cavity 84 through the branch passage 18 disposed to pass through the turbine casing 39. The high temperature high humidity air 110 is supplied via the cavity 84 to the gas path, merging with the combustion gas of the working medium or fluid 37.

In the present embodiment, the cavity 84 and the gas path are formed as a circumferentially continuous space so that the communicating portion between the cavity 84 and the gas path can be formed to have a large area. Therefore, a large flow rate of the high temperature high humidity air 110 can be supplied to the gas path, which provides an advantage of increasing the operable range of the gas turbine.

According to the present embodiment, when the humidity gas turbine cycle is applied to the two-shaft gas turbine, the efficiency of the gas turbine can be improved and the driving force of the compressor and the output power of the high-pressure turbine can be balanced to stably operate the gas turbine. Thus, the two-shaft gas turbine enhanced in reliability can be achieved.

Eleventh Embodiment

Figure 12:
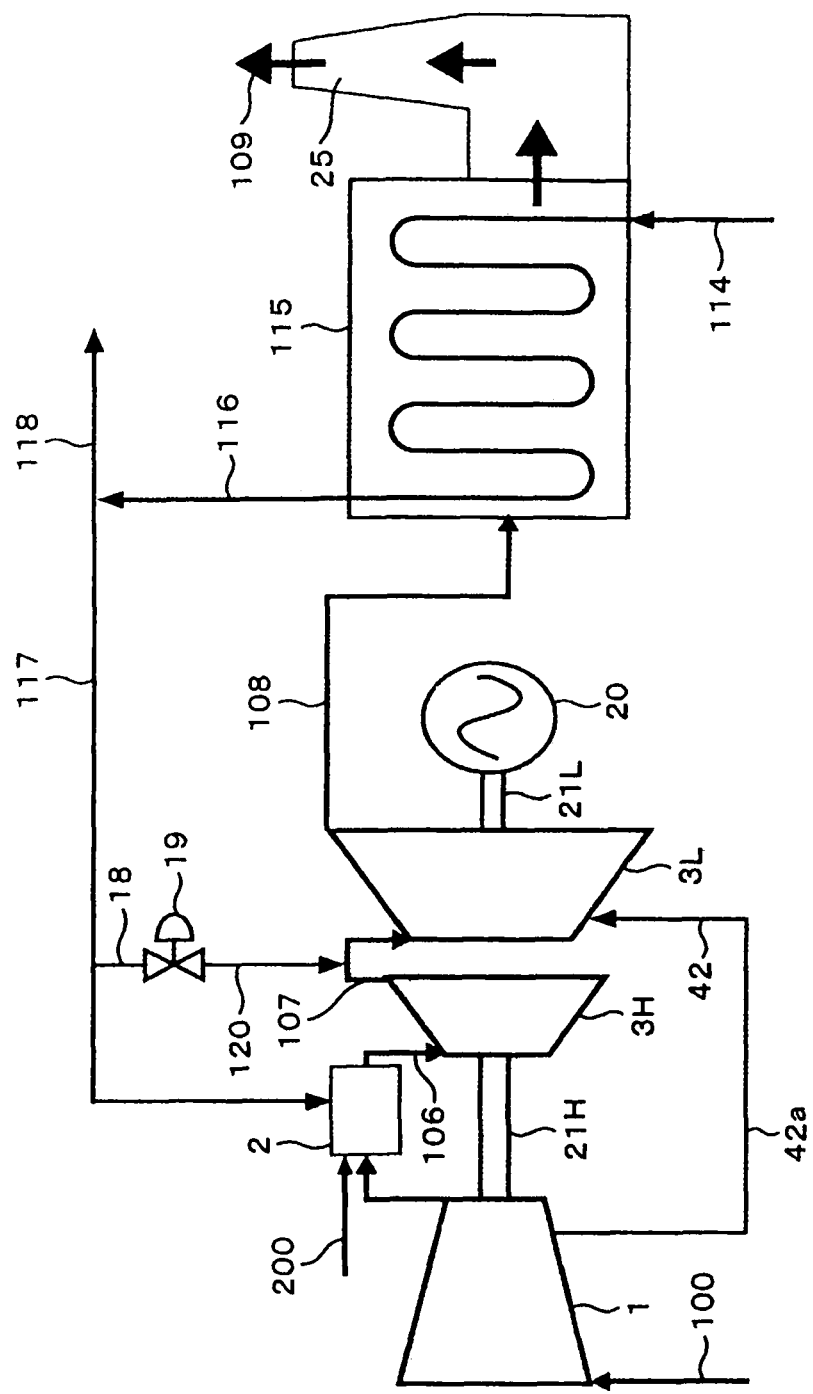
FIG. 12 is a schematic system flow diagram illustrating the entire configuration of a conventional gas turbine system provided with a two-shaft gas turbine according to an eleventh embodiment of the present invention.

A description is next given of a two-shaft gas turbine according to an eleventh embodiment where the present invention is applied to a conventional gas turbine system with reference to FIG. 12.

In the humidity gas turbine system of the early embodiment illustrated in FIG. 1, the fluid allowed to flow into the gas path is the high temperature high humidity air 110 partially divided from the high temperature high humidity air 105. However, in a gas turbine system having a steam generation source located adjacent thereto, it is conceivable that steam is injected in place of the high temperature high humidity air 110.

Consequently, the two-shaft gas turbine in the gas turbine system according to the present embodiment is configured to use as a steam generation source an exhaust heat recovery boiler which uses the heat quantity of the exhaust gas of the gas turbine to produce steam.

FIG. 12 is a system flow diagram illustrating the overall configuration of a gas turbine system in which steam produced by an exhaust heat recovery boiler 115 by use of the heat quantity of the exhaust gas of the gas turbine is injected on the upstream side of a low-pressure turbine 3L.

In the two-shaft gas turbine for power generation in the present embodiment illustrated in FIG. 12, the explanation of the configuration common to the humidity gas turbine system of the early embodiment illustrated in FIG. 1 is omitted.

In the two-shaft gas turbine for power generation illustrated in FIG. 12, high temperature combustion gas generated by a combustor 2 is sequentially supplied to and drives a high-pressure turbine 3H and a low-pressure turbine 3L. The low pressure turbine exhaust gas 108 discharged from the low-pressure turbine 3L is supplied to the exhaust heat recovery boiler 115 which recovers the heat quantity of the exhaust gas 108 to produce steam.

Feed-water 114 supplied to the exhaust heat recovery boiler 115 is subjected to thermal exchange with low-pressure turbine exhaust gas 108 in the exhaust heat recovery boiler 115 to produce steam 116.

The low-pressure turbine exhaust gas 108 flowing through the exhaust heat recovery boiler 115 to decrease in temperature is discharged as exhaust gas 109 from an exhaust tower 25 to the outside.

The steam 116 produced by the exhaust heat recovery boiler 115 is divided into steam 117 supplied to the gas turbine and steam 118 supplied to another steam-use installation. The steam 117 supplied to the gas turbine is partially or fully supplied, as divided steam 120, through a branch pipe 18 equipped with a flow control valve 19 to the gas path from the upstream side of the low-pressure turbine 3L. In the gas path, the divided steam 120 merges with high-pressure turbine exhaust gas 107 flowing from the high-pressure turbine 3H.

In other words, the divided steam 120 supplied from the upstream side of the low-pressure turbine 3L to the gas path in the present embodiment corresponds to the divided high temperature high humidity air 110 supplied from the upstream side of the low-pressure turbine 3L to the gas path in the early embodiment illustrated in FIG. 1.

Examples of the other steam-use installation conceivably include a steam turbine of a combined cycle gas turbine and a steam-use installation of a cogeneration system.

Incidentally, the steam used as the divided steam 120 of the present embodiment has higher coefficient of heat transfer than air. Therefore, the steam has a high cooling effect so that it can lower the material temperature of the low-pressure turbine 3L close to the flow of the divided steam 120.

Consequently, by using the divided steam 120 in place of the high temperature high humidity air 110 in the early embodiment illustrated in FIG. 1, a low-end material with low heatproof temperature can be used as a material constituting the low-pressure turbine 3L. Thus, the production cost of the two-shaft gas turbine can be reduced.

According to the present embodiment, when the system injecting steam into the gas turbine combustor is applied to the two-shaft gas turbine, the efficiency of the gas turbine can be improved and the driving force of the compressor and the output power of the high-pressure turbine can be balanced to stably operate the gas turbine. Thus, the two-shaft gas turbine enhanced in reliability can be achieved.

That is to say, in the two-shaft gas turbine including a compressor 1 for compressing air; the exhaust heat recovery boiler 115 which is a means for injecting steam into the air compressed by the compressor 1; the combustor 2 for producing combustion gas by firing fuel and the air into which the steam is injected by the steam injection means; the high-pressure turbine 3H coaxially coupled to the compressor 1 and driven by the combustion gas produced by the combustor 2; and the low-pressure turbine 3L driven by the exhaust gas discharged from the high-pressure turbine 3H, the high-pressure turbine 3H and the low-pressure turbine 3L being configured to have respective independent shafts, the branch passage 18 is provided which is a branch path adapted to partially divide the air into which the steam is injected by the steam injection means before supply to the combustor 2 and lead such divided air to the low-pressure turbine 3L. Thus, the effects described above can be achieved.

FIG. 12 illustrates the embodiment where the steam produced by the exhaust heat recovery boiler 115 using the heat quantity of the exhaust gas of the gas turbine is supplied to the combustor and the gas path. However, the steam generation source may be a boiler or the like installed separately from the gas turbine. If steam usage is varied in various steam-using plants, thermal efficiency can be improved by injecting extra steam into the gas turbine. In this case, if the two-shaft gas turbine is applied, the present invention can establish a balance between the driving force of the compressor and the output power of the high-pressure turbine to stably operate the gas turbine.

Twelfth Embodiment

Figure 13:
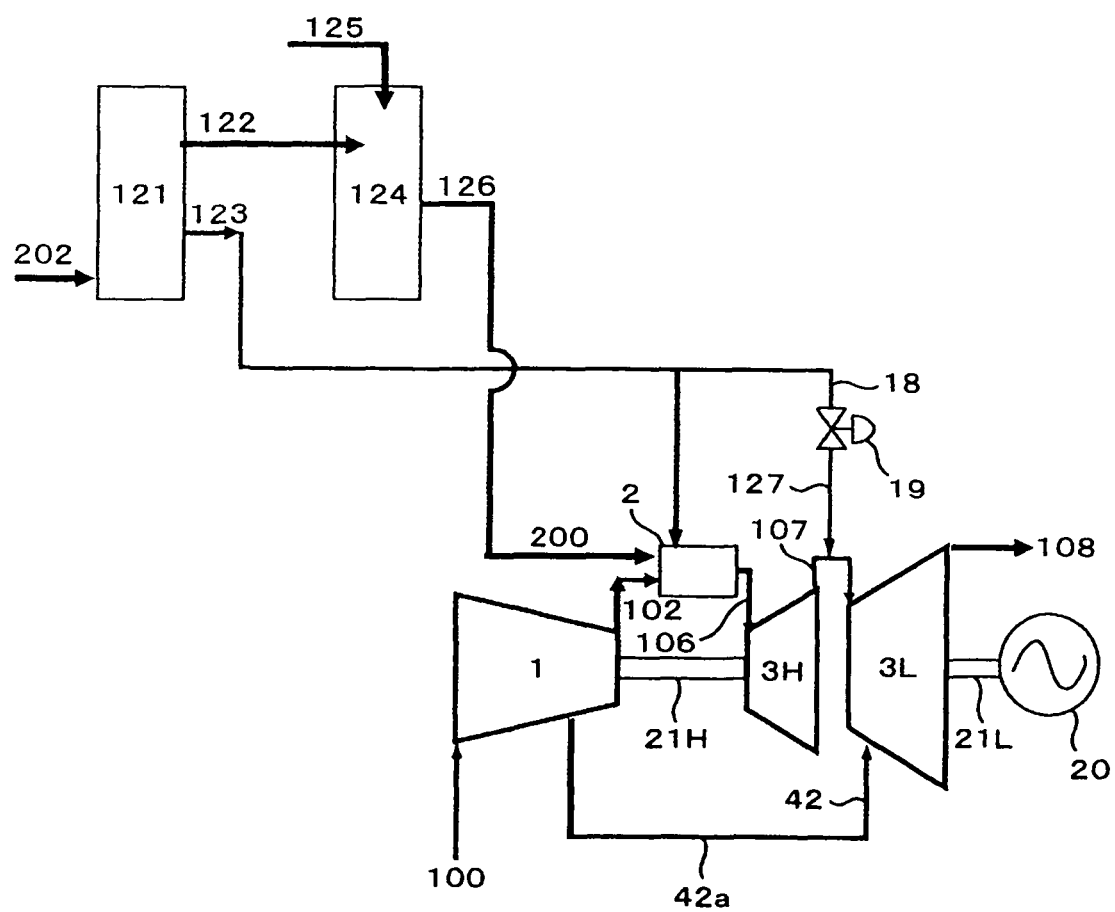
FIG. 13 is a schematic system flow diagram illustrating the entire configuration of a gas turbine system provided with a two-shaft gas turbine according to a twelfth embodiment of the present invention.

A description is next given of a two-shaft gas turbine according to a twelfth embodiment where the present invention is applied to another gas turbine system with reference to FIG. 13.

FIG. 13 is a system flow diagram illustrating the overall configuration of a gas turbine system where nitrogen produced when coal gasification gas is produced is injected on the upstream side of a low-pressure turbine 3L.

In the two-shaft gas turbine for power generation in the present embodiment illustrated in FIG. 13, the explanation of the configuration common to the humidity gas turbine system of the early embodiment illustrated in FIG. 1 is omitted.

In the two-shaft gas turbine for power generation illustrated in FIG. 13, gasification gas 202 compressed by a separate placement compressor separate from a compressor 1 is supplied to an air separation system 121 and separated into oxygen 122 and nitrogen 123. The oxygen 122 is led to a gasifier 124 in which the oxygen 122 and coal 125 produce coal gasification gas 126. The coal gasification gas 126 thus produced is used as fuel 200 for the gas turbine.

In contrast, the nitrogen 123 separated in the air separation system 121 is injected into the combustor 2. This can lower local flame temperature in the combustor to reduce the discharge amount of the nitrogen oxide (NOx) produced in the combustor.

In such a gas turbine, nitrogen is injected into the combustor to increase the flow rate of working fluid driving a high-pressure turbine 3H. In other words, a nitrogen intake path also plays a role of a flow-increasing means for increasing the flow rate of working fluid. This will increase the output power of the high-pressure turbine to rotate the high-pressure turbine and the compressor 1 at excessive speeds if nothing is done.

Consequently, a portion of the nitrogen 123 is passed through a branch passage 18 which is a branch path equipped with a branch flow control mechanism 19 which is a flow control valve and supplied, as divided nitrogen 127, to the gas path from the upstream side of the low-pressure turbine 3L. This divided nitrogen 127 merges with high-pressure turbine exhaust gas 107 flowing from the high-pressure turbine 3H.

In other words, the divided nitrogen 127 supplied from the upstream side of the low-pressure turbine 3L to the gas path in the present embodiment corresponds to the high temperature high humidity air 110 supplied from the upstream side of the low-pressure turbine 3L to the gas path in the early embodiment illustrated in FIG. 1.

The divided nitrogen 127 is injected into the low-pressure turbine 3L to increase low-pressure turbine inlet pressure accordingly, and therefore also the outlet pressure of the high-pressure turbine 3H is increased. Therefore, the expansion ratio of the high-pressure turbine 3H is slightly reduced to compensate for an increase in the output power of the high-pressure turbine due to the nitrogen injection.

Thus, in the case where the two-shaft gas turbine is used in the coal gasification system and nitrogen produced from the air separation system is injected into the combustor, the present invention can establish a balance between the driving force of the compressor and the output power of the high-pressure turbine to stably operate the gas turbine.

Incidentally, nitrogen used as the divided nitrogen 127 in the present embodiment has lower temperature than the compressed air 101 to increase the cooling effect; therefore, the material temperature of the low-pressure turbine 3L close to the flow of the divided nitrogen 127 can be lowered.

Consequently, since the divided nitrogen 127 is used in place of the high temperature high humidity air 110 of the early embodiment illustrated in FIG. 1, a low-end material with low heatproof temperature can be used as a material constituting the low-pressure turbine 3L. Thus, the production cost of the two-shaft gas turbine can be reduced.

Thirteenth Embodiment

Figure 14:
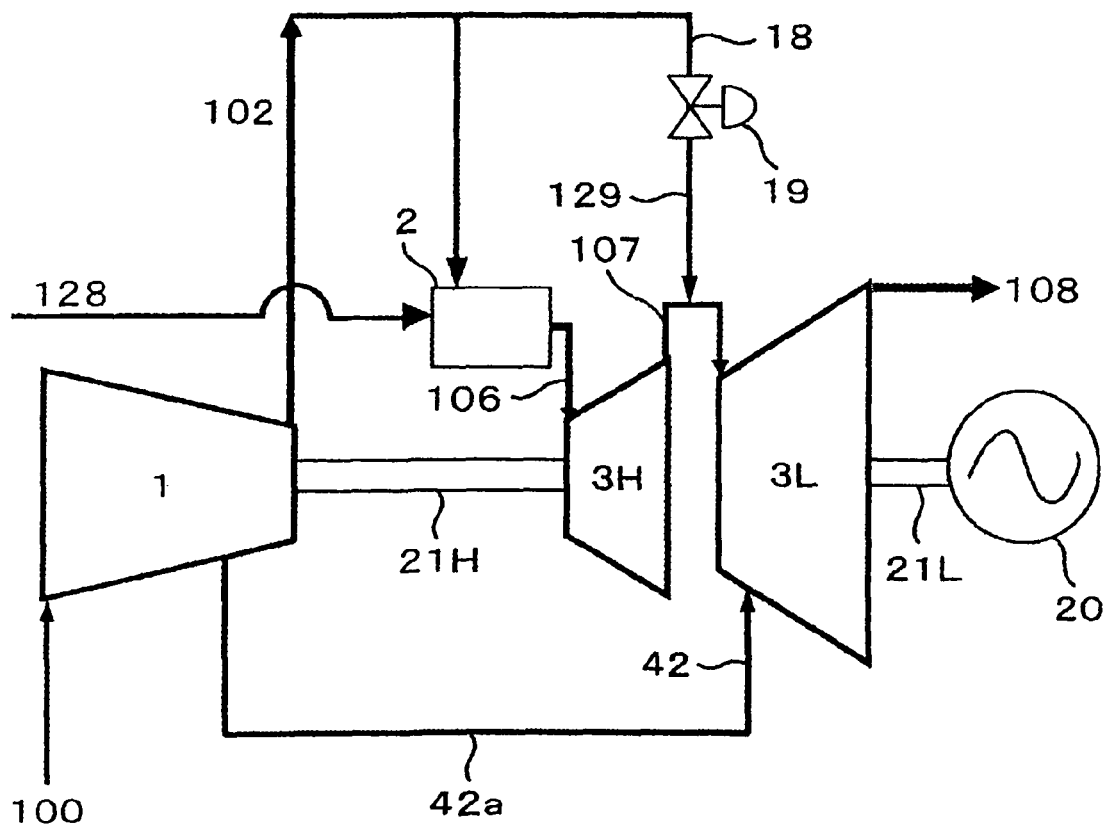
FIG. 14 is a schematic system flow diagram illustrating the entire configuration of a gas turbine system provided with a two-shaft gas turbine according to a thirteenth embodiment of the present invention.

A description is next given of a two-shaft gas turbine according to a thirteenth embodiment where the present invention is applied to another gas turbine system with reference to FIG. 14.

FIG. 14 is a system flow diagram illustrating the overall configuration of a gas turbine system where a portion of compressed air is injected on the upstream side of a low-pressure turbine 3L when low-calorific gas is used as fuel for a gas turbine combustor.

In the two-shaft gas turbine for power generation in the present embodiment illustrated in FIG. 14, the explanation of the configuration common to the humidity gas turbine system of the early embodiment illustrated in FIG. 1 is omitted.

In the two-shaft gas turbine for power generation in the present embodiment illustrated in FIG. 14, low calorific gas 128 corresponds to the fuel 200 of FIG. 1. Low calorific gas has a calorific value not greater than half that of ordinary gas fuel such as natural gas. Further lower calorific gas has a calorific value as small as about one-tenth of that of the ordinary gas fuel. Therefore, a large amount of fuel has to be supplied to operate the gas turbine at a given rated fuel gas temperature.

Since a large amount of fuel is supplied to the combustor, the flow amount of working fluid used to drive a high-pressure turbine 3H is increased to increase the output power of the high-pressure turbine. Therefore, the high-pressure turbine and the compressor 1 will rotate at excessive speeds if nothing is done. In the two-shaft gas turbine using the low calorific gas as fuel in the present embodiment, before a portion of compressed air 102 compressed by the compressor 1 is supplied to the combustor 2, it is passed through a branch passage 18 which is a branch path equipped with a branch flow control mechanism 19 which is a flow control valve and supplied as divided air 129 from the upstream side of the low-pressure turbine 3L to the gas path. In the gas path, the divided air 129 merges with high-pressure turbine exhaust gas 107 flowing from the high-pressure turbine 3H.

In other words, the divided air 129 supplied from the upstream side of the low-pressure turbine 3L to the gas path corresponds to the high temperature high humidity air 110 in the present embodiment supplied from the upstream side of the low-pressure turbine 3L to the gas path in the early embodiment illustrated in FIG. 1.

The divided air 129 is injected to the low-pressure turbine 3L to increase the low-pressure turbine inlet pressure accordingly. Therefore, also the outlet pressure of the high-pressure turbine 3H is increased. This slightly reduces the expansion ratio of the high-pressure turbine 3H to compensate for an increase in the output power of the high-pressure turbine resulting from the combustion of low calorific fuel.

In this way, when the two-shaft gas turbine is used in a low calorific gas firing gas turbine system, the present invention can establish a balance between the driving force of the compressor and the output power of the high-pressure turbine to stably operate the gas turbine.

Incidentally, low-calorific gas is conceivably produced, for example, by a coal gasification plant using air or by various plants such as a steel plant and an oil factory. In addition, low-calorific gas conceivably occurs as a side product in oilfields and in gas fields. It is probable that the low-calorific gas may vary in the calorific value of fuel due to the operating conditions or seasonal change of the generation source. Also in such a case, if the calorific value is large, the branch flow control mechanism 19 which is a branch valve is adjusted to reduce its opening angle to reduce the flow rate of the divided air 129. In contrast, if the calorific value is small, the branch flow control mechanism 19 is adjusted to increase its opening angle to increase the flow rate of the divided air 129. Thus, even if the calorific value varies, a balance can be established between the driving force of the compressor and the output power of the high-pressure turbine to stably operate the gas turbine.

Fourteenth-Seventeenth Embodiments

A description is hereinafter given of fourteenth-seventeenth embodiments according to the present invention where a load is attached to a shaft 21H or a shaft on the side of a high-pressure turbine 3H.

As with a single-shaft gas turbine, a two-shaft gas turbine adjusts an amount of input fuel to control its output power. The two-shaft gas turbine is largely different from the singeshaft gas turbine in that it has to establish a balance between the consumption power of a compressor and the output power of a high-pressure turbine to keep rotation speed constant. (Note that the consumption power and output power mentioned above each include a loss, which applies to the following.) If the amount of input fuel is varied to control the output power of the gas turbine, the consumption power of the compressor and the output power of the high-pressure turbine are each varied to lose the power balance. This makes it impossible to keep the rotation speed constant. To establish the balance of power, it is necessary to adjust the flow rate of compressor working fluid, to vary the rotation speed during balance, to adjust the inlet pressure of the high-pressure turbine, or to adjust the inlet pressure of the low-pressure turbine. Among these control methods, adjusting the inlet pressure of the high-pressure turbine and of the low-pressure turbine needs to install a variable nozzle or the like in the vicinity of the turbine inlet having very high temperatures. Therefore, adopting this method tends to be avoided. In general, the following method is often adopted as the balance control method: the flow rate of the compressor working gas is adjusted by an inlet guide vane installed in a compressor and rotation speed is varied during balance. Because of these factors, the compressor of the two-shaft gas turbine is designed to permit the wider range of compressor working gas flow and of operation speed, compared with the compressor of the single-shaft gas turbine. In other words, the compressor of the two-shaft gas turbine needs stable operation under wider operational conditions in terms of design, compared with the compressor of the single-shaft gas turbine. If it is intended to ensure reliability in a wide operation range, in general efficiency lowers and cost rise. More specifically, the following measures may be taken to achieve the wider range of compressor working gas flow. The number of stages of variable nozzles is increased. Blades or vanes are adopted that have profile less liable to cause an unstable phenomenon such as separated flow. The profile of the blades or vanes is limited to avoid resonance. These may probably cause the lowered efficiency and raised cost.

Now, consideration is given to a two-shaft gas turbine in which the flow rate of the working gas of the high-pressure turbine is relatively higher than that of the working gas of the compressor. In particular, consideration is given to a two-shaft type humidity gas turbine as a representative example. The humidity gas turbine needs stable operation under further wider operation conditions in terms of design than the simple cycle gas turbine because of an influence of moisture added to the working gas. That is to say, the two-shaft humidity gas turbine may probably cause further lowered efficiency and raised cost compared with the two-shaft gas turbine that does not use moisture.

In the first place, the humidity gas turbine is such that the moisture added to the compressor working gas contributes to a reduction in compressor power consumption per unit mass. In contrast, the moisture added to the working gas of the high-pressure turbine contributes to an increase in the output power of the high-pressure turbine per unit mass. In short, the output power of the high-pressure turbine is increased compared with the compressor power consumption in view of a heat cycle. If the influence of the moisture added is large, then the balance control method will not be established in terms of a heat cycle only by the adjustment of the compressor working gas flow by means of the inlet guide vane mentioned above and by the variation in the rotation speed during the balance. The flow adjustable by the inlet guide vane installed in the compressor is as small as about 5%. The further adjustment may largely impair compressor performance. For example, in the two-shaft gas turbine where the exhaust flow of the high-pressure turbine is increased by 10% compared with the inlet flow of the compressor, it is difficult to perform the balance control by use of the conventional ordinary technique.

The simple cycle gas turbine and the humidity gas turbine are different from each other in output distribution between the high-pressure turbine and the low-pressure turbine. The humidity gas turbine is greater than the simple cycle gas turbine in the proportion of the low-pressure turbine output power to the total of the high-pressure turbine output power and the low-pressure turbine output power. If it is desirable to operate the high-pressure turbine and the low-pressure turbine at desired output power or at desired rotation speed, it is necessary to vary their output distribution.

There is a two-shaft type humidity gas turbine of another type where the flow of the high-pressure turbine working gas is relatively greater than that of compressor working gas. Also in this turbine, the high-pressure turbine output power is greater than the compressor power consumption to the extent that it is difficult for the conventional ordinary technique to exercise the balance control, as with the two-shaft type humid air gas turbine. The proportion of the low-pressure turbine output power to the total of the output power tends to increase compared with the high-pressure turbine output power. Examples of the gas turbine of another type include a two-shaft gas turbine of a type where steam produced by the exhaust heat recovery boiler is injected into a combustor; and a gas turbine system using low-calorific fuel. The gas turbine using low-calorific fuel needs a large amount of fuel compared with a gas turbine using general fuel so that the flow rate of fuel taking up a proportion of the flow rate of high-pressure working gas is increased. Consequently, the flow rate of the high-pressure turbine working gas is relatively increased compared with the compressor working gas.

An object of the invention described with reference to embodiments as below is to provide configurations of humid air gas turbines that can easily establish a balance between the compressor-driving power and turbine-driving output power.

A gas turbine such as a two-shaft type humidity gas turbine in which the flow rate of high-pressure turbine working gas is relatively more than that of the compressor working gas is described below according to each embodiment. This gas turbine can simply establish a balance between the power consumption of a compressor and the output power of a high-pressure turbine. Thus, the two-shaft gas turbine with high thermal efficiency and reliability can be provided.

Specifically, the following can be said in the overall operation including starting operation, stoppage operation and load operation. A gas generator composed of a compressor and a turbine driving the compressor can easily adjust its rotation speed by controlling a load coupled or joined to its rotating shaft. Therefore, also the gas generator can exercise operation control similar to that of a single-shaft gas turbine, which significantly simplifies an operation control method compared with the operation control method of the general two-shaft gas turbine. This can facilitate control logic, improving reliability during operation. In general, the compressor of the two-shaft gas turbine needs the range of compressor working gas flow and of operation-rotation speed wider that of the compressor of the single-shaft gas turbine. However, it is possible to reduce or equalize such a range. It is difficult for the conventional ordinary technique to avoid lowered efficiency and raised cost in compensation for ensuring safety operation under wide operation conditions. However, the present invention can limit the range of compressor working gas flow and of operation-rotation speed to a narrow range; therefore, it is possible to suppress efficiency reduction and cost rise. Further, it is possible to divert the compressor of a single-shaft gas turbine so as to reduce or cut cost and time needed for development, design and production. In addition, diversion of component parts can reduce the number of newly-developed parts and is advantageous in view of ensuring reliability and of management.

Two-shaft gas turbines according to fourteenth through seventeenth embodiments are respectively described below with reference to FIGS. 15 through 19.

Fourteenth Embodiment

Figure 15:
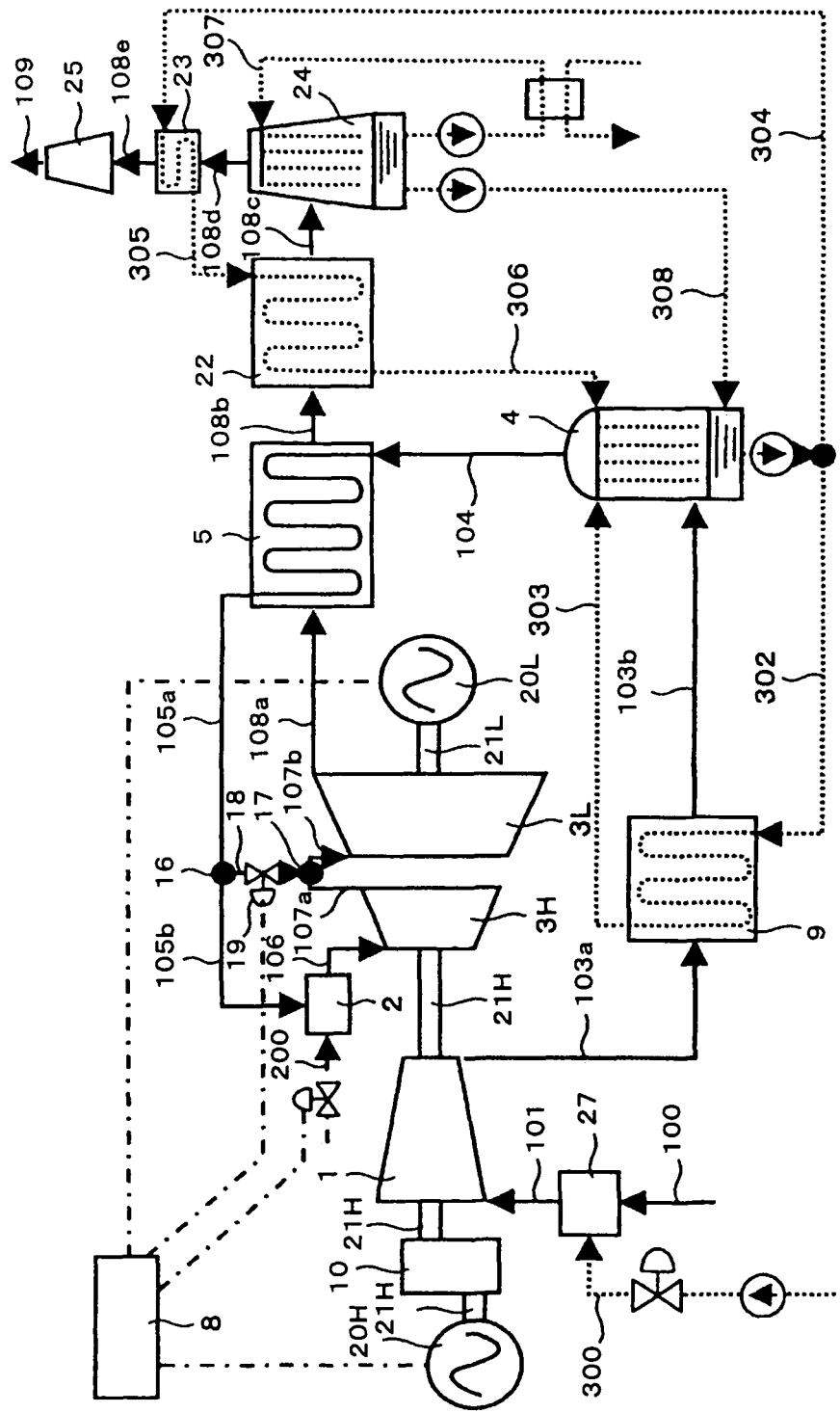
FIG. 15 is a circuit diagram illustrating the entire configuration of a two-shaft type humidity gas turbine system according to a fourteenth embodiment of the present invention.

FIG. 15 is a circuit diagram illustrating the overall configuration of a two-shaft type humidity gas turbine plant according to the fourteenth embodiment of the present invention.

This plant mainly includes a compressor 1, a combustor 2, a high-pressure turbine 3H, a low-pressure turbine 3L, a first generator 20L, a second generator 20H, a control unit 8, a water atomization cooling system 27, an air cooler 9, a humidifier 4, a recuperator 5, an economizer 22, a water recovery system 24, an exhaust gas reheater 23, a branch passage 16, a confluence passage 17 and a flow control valve 19.

Compressor inlet air 100 to be introduced into the compressor 1 is led to the water atomization cooling system 27. In the water atomization cooling system 27, water 300 supplied thereto is atomized and then sprayed, while partially evaporates. Such evaporation absorbs thermal energy from the compressor inlet air 100 which is atmosphere, so that when flowing into the compressor 1, air 100 drops in temperature to a level lower than atmospheric temperature. In contrast, the atomized water remaining unchanged as liquid without evaporation is led to the compressor 1. In other words, the working fluid 101 which is a main stream discharged from the water atomization cooling system 27 is a mixture of air 100, water steam resulting from partial evaporation from the atomized water 300, and water particles which are the atomized water 300 remaining unchanged as liquid without evaporation.

In the compressor 1 the working fluid 101 which is the mixture of introduced air 100, water steam and water particles is compressed to a given pressure and led to the air cooler 9 disposed downstream. At this time, the water particles gradually evaporate, becoming water steam. In this case, since thermal energy is absorbed from the atmosphere, the temperature rise of the working fluid is alleviated compared with no water particles.

The compressed air 103a led to the air cooler 9 is cooled and then led to the humidifier 4 disposed downstream. The air cooler 9 uses the recovery water 302 of the humidifier 4 as a cooling medium. The recovery water 302 cools the compressed air 103a by thermal exchange to rise in temperature, and then is recovered as supply water 303 to the humidifier 4. That is to say, a portion of the cooling medium circulates through the air cooler 9 and humidifier 4. This function allows the thermal energy absorbed from the working fluid in the air cooler 12 to be transferred to the humidifier 4.

The compressed air 103b cooled by and supplied from the air cooler 9 is humidified by the humidifier 4 to become high humidity air 104, which is led to the recuperator 5 disposed downstream. The present embodiment adopts a humidifying tower method; however, it can reasonably use a wetted-wall column or a spray method which uses a spray nozzle to spray water to the compressed air 103b. High temperature water used for humidification is supplied from the air cooler 9 and from the economizer 22. A portion of the water recovered without evaporation is used as a cooling medium of the air cooler 9 and as a heat source of the exhaust gas reheater 23 described later.

The high humidity air 104 is heated by the recuperator 5 to become high temperature high humidity air 105a, which is led to the branch passage 16. Exhaust gas 108a from the low-pressure turbine 3L is used as a heat source of the recuperator 5. The exhaust gas 108b subjected to thermal exchange in the recuperator 5 to drop in temperature is led as a heat source to the economizer 22 disposed downstream.

The branch passage 16 is adapted to lead a given flow rate of the high temperature high humidity air 105a led from the recuperator 5, to the combustor 2 as high temperature high humidity air 105b, and the remaining flow rate to the confluence passage 17 as high temperature high humidity air 18. Incidentally, the distribution of flow rate is controlled by the flow control valve 19. This control method is described later.

The high temperature high humidity air 105b led to the combustor 2 is used to burn fuel 200 for producing combustion gas 106. The combustion gas 106 is led to the high-pressure turbine 3H disposed downstream.

The combustion gas 106 led to the high-pressure turbine 3H performs expansion work to produce rotational power therein. The compressor 1, a transmission 10 and the second generator 20H are connected to one another via the rotating shafts 21H. A portion of the power produced by the high-pressure turbine 3H is consumed by the compressor 1 and the remainder is converted by the second generator 20H into electric power, which is used by the outside of this plant. Combustion gas 107a lowering in temperature and in pressure as a result of the expansion work is led to the confluence passage 17. Incidentally, the generator is connected as a load to the compressor in the present embodiment; however, a load such as a pump, etc., or a combination of the generator with another load may reasonably be connected to the compressor.

The combustion gas 107a and the high temperature high humidity air 18 merge with each other in the confluence passage 17 to become mixed gas 107b, which is led to the low-pressure turbine 3L disposed downstream.

The mixed gas 107b of the combustion gas with the high temperature high humidity air led to the low-pressure turbine 3L performs expansion work to produce rotational power therein. A first generator 20L is connected to the low-pressure turbine 3L via a rotating shaft 21L. The rotational power produced in the low-pressure turbine 3L is converted by the first generator 20L into electric power, which is used by the outside of this plant. Exhaust gas 108a which is mixed gas of the combustion gas with high temperature high humidity air and lowers in temperature and in pressure as a result of the expansion work is led as a heat source to the recuperator 5. Incidentally, the generator is connected as a load to the compressor in the present embodiment; however, a load such as a pump, etc., or a combination of the generator with another load may reasonably be connected to the compressor.

Water 305 is heated in the economizer 22 to become high temperature water 306, which is led to the humidifier 4. A heat source of the economizer 22 is exhaust gas 108b of the recuperator 5. The exhaust gas 108b from which thermal energy is recovered becomes low temperature exhaust gas 108C, which is led to the water recovery system 24 disposed downstream.

The exhaust gas 108c led to the water recovery system 24 comes into contact with cooling water 307 so that moisture existing therein is recovered. The exhaust gas 108c from which the moisture is recovered becomes exhaust gas 108d, which is led to the exhaust gas reheater 23 disposed downstream.

The moisture-recovered exhaust gas 108d led to the exhaust gas reheater 23 is reheated to become exhaust gas 108e. The exhaust gas 108e is led to a funnel 25, from which the exhaust gas 108e is vented to the atmosphere. The heat source of the exhaust gas reheater 23 uses the recovery water 304 of the humidifier 4.

A description is next given of a method of adjusting output power of the two-shaft gas turbine according to the present embodiment.

It is assumed that the generator used in the present embodiment is the most common two-pole AC generator in gas turbine-driven generators with a output power of 3 MW or more. This generator is used to generate AC power with the same frequency as the rotation speed. For example, if the generator is operated at 3600 rpm, an electric power of 60 Hz is generated. In operation, the generator must be driven at constant rotation speed. It is necessary, therefore, to adjust the output power of the gas turbine so as to match the load, i.e., demanded electric power of the generator, thereby keeping the rotation speed constant. In the gas turbine of the present embodiment, the control unit 8 calculates the flow rate of input fuel based on the demanded electric power and controls the electric power distribution between the first generator 20L and the second generator 20H. In other words, the control is exercised so that the total electric power of the first generator 20L and the second generator 20H may be equal to the demanded electric power and the first generator 20L and the second generator 20H have a given rotation speed.

If the demanded electric power is increased, the control unit 8 distributes the increase in electric power into the generators. If the electrical energy is increased, a load is increased. Therefore, the rotating shaft 21L connected to the first generator 20L and the rotating shaft 21H connected to the second generator 20H, i.e., both the shafts, are reduced in rotation speed. If the rotation speed is reduced, the control unit 8 exercises control so that the amount of input fuel is increased to return the rotation speed to a given rotation speed. If the flow rate of fuel is increased, the high-pressure turbine 3H and the low-pressure turbine 3L increase output power to raise rotation speed. Such control can establish a balance between the turbine output and generator output while providing demanded electric power, and also rotate both the generators at a steady rotation speed.

In this sequence of control, the rotation speed of the first generator 20L may be smaller than a predetermined rotation speed and the rotation speed of the second generator 20H may be greater than a predetermined rotation speed. In such a case, the control unit 8 exercises control so as to reduce the load of the first generator 20L. In addition, the control unit 8 exercises control so as to increase the load of the second generator 20H to compensate for the deficient electric power corresponding to the reduced load of the first generator 20L.

In contrast, the rotation speed of the first generator 20L may be greater than a predetermined rotation speed and the rotation speed of the second generator 20H may be smaller than a predetermined rotation speed. In such a case, the control unit 8 exercises control so as to reduce the load of the second generator 20H and to increase the load of the first generator to compensate for the reduced load of the second generator 20H.

The rotation speed of the first generator 20L may be smaller than a predetermined rotation speed and also the rotation speed of the second generator 20H may be smaller than a predetermined rotation speed. In such a case, the control unit 8 exercises control to increase the amount of input fuel. In contrast, the rotation speed of the first generator 20L may be greater than a predetermined rotation speed and also the rotation speed of the second generator 20H may be greater than a predetermined rotation speed. In such a case, the control unit 8 exercises control so as to reduce the amount of input fuel.

In this way, if the demanded electric power is increased, the control unit 8 exercises control as below. The total electric power generated by the first generator 20L and the second generator 20H is equal to the demanded electric power. In addition, the first generator 20L and the second generator 20H are made to have balanced output power and a given rotation speed.

If the demanded electric power is reduced, the control unit 8 distributes the reduction in electric power between the first and second generators. When production of electricity is reduced, a load is reduced. Therefore, the rotating shaft 21L connected to the first generator 20L and the rotating shaft 21H connected to the second generator 20H, i.e., both the shafts, are increased in rotation speed. When the rotation speed is increased, the control unit 8 exercises control so as to reduce the amount of input fuel to return the rotation speed to the given rotation speed. When the flow rate of fuel is reduced, the high-pressure turbine 3H and the low-pressure turbine 3L are lowered in output power to reduce rotation speed. In a sequence of this control, if it is necessary to adjust the rotation speed of each of the first generator 20L and the second generator 20H, control is exercised by the distribution adjustment of the load or by the adjustment of the amount of input fuel. In this way, if the demanded electric power is reduced, the control unit 8 exercises control as below. The total electric power generated by the first generator 20L and the second generator 20H is equal to the demanded electric power. The first generator 20L and the second generator 20H are made to have equal output power and a given rotation speed.

Based on the rotation speed of each of the high-pressure turbine 3H and the low-pressure turbine 3L, adjustment is performed on a load necessary for the second generator 20H which is a second load. This adjustment brings the rotation speed of the high-pressure turbine 3H close to a given rotation speed. Thus, a balance can easily be established between the power consumption of the compressor 1 and the output power of the high-pressure turbine 3H.

Incidentally, the two-shaft gas turbine of the present embodiment has the confluence passage 17 adapted to join a portion of the high temperature high humidity air 105a which is fluid to be supplied to the combustor 2, in the middle of the passage adapted to supply the combustion gas 107a driving the high-pressure turbine 3H to the low-pressure turbine 3L. Therefore, it is possible to adjust the load distribution between the loads, i.e., the distribution of electric power between the first generator 20L and the second generator 20H by means of the flow control valve 19 installed between the branch passage 16 and the confluence passage 17. If at least one of the loads is not the generator but a turbo machine such as a pump, this function is especially effective as means for independently adjusting the loads. In addition to this flow adjustment, the control is exercised to adjust the magnitude of each load, whereby more optimal rotation speed control becomes possible.

Figure 19:
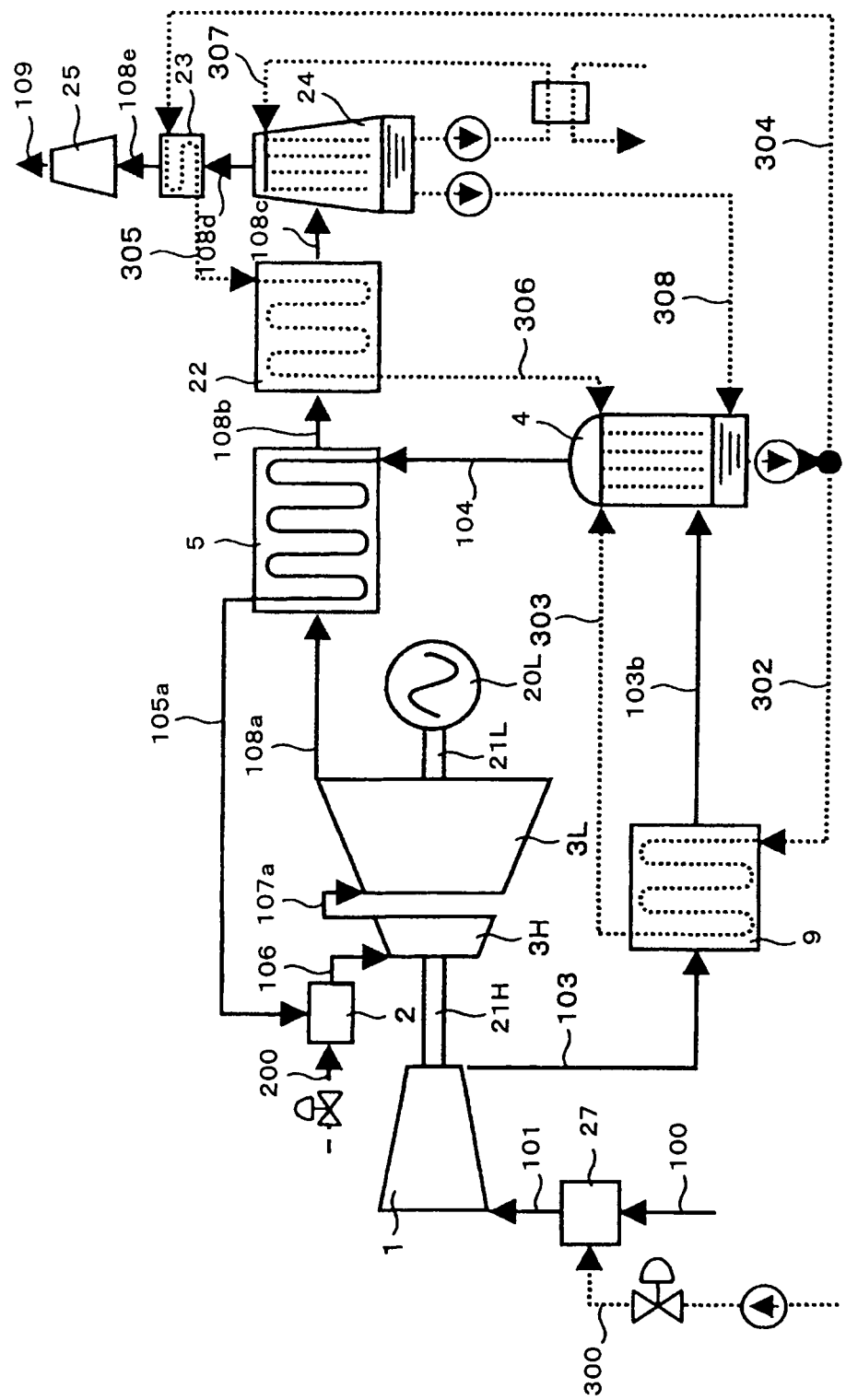
FIG. 19 is a schematic circuit diagram of a two-shaft type humidity gas turbine by way of comparative example.

Now, a two-shaft type humidity gas turbine is described as a comparative example with reference to FIG. 19 in order to explain the advantage of the gas turbine according to each embodiment of the present invention.

FIG. 19 is a schematic circuit diagram of the two-shaft type humidity gas turbine of the comparative example. Elements indicated with like reference numerals have the same functions as those in FIG. 15. For simplicity, it is assumed that a compressor 1 has the same performance. In this case, a high-pressure turbine 3H needs only to drive the compressor 1 so that the power generated by the high-pressure turbine 3H is smaller than that of the high-pressure turbine 3H of the fourteenth embodiment. Therefore, the output power of the low-pressure turbine 3L is increased accordingly. In other words, the distribution of output power between the high-pressure turbine 3H and the low-pressure turbine 3L is different from that of the fourteenth embodiment.

An output adjustment method is next described. The flow rate of fuel 200 is calculated from demanded electric power and fed to a combustor 2. If the demanded electric power is smaller than rated electric power, the flow rate of input fuel 200 is smaller than the rated flow rate. In this case, since the output power of the high-pressure turbine 3H is reduced, also the rotation speed of the first rotating shaft 21H lowers. Therefore, the inlet flow rate and pressure ratio of the compressor 1 are reduced to reduce power consumption. Thus, the power balance can finally be established between the compressor 1 and the high-pressure turbine 3H at a rotation speed smaller than the rated rotation speed. In other words, the operating rotation speed of the first rotating shaft 21H is varied depending on the demanded electric power. This is the characteristic of the two-shaft gas turbine as described above. Since the rotation speed of the first rotating shaft 21H is varied depending on the operating range of demanded output power, the compressor 1 and the high-pressure turbine 3H are required to be safely operatable in this range of rotation speed. That is to say, it is necessary to perform the resonance-avoidance design on compressor blades, turbine blades and rotating shafts in this range of rotation speed. If the rotation speed range where resonance must be avoided is extended, restrictions are increased on the respective shapes of the compressor blades, turbine blades, and rotating shafts. These restrictions have an influence on performance, cost or reliability.

A description is given of the superiority of the two-shaft gas turbine according to each embodiment of the present invention to the two-shaft gas turbine of the comparative example described above.

The two-shaft gas turbine of the present embodiment includes the compressor 1 for compressing air; a humidifier 13 which is means for adding fluid to compressed air compressed by the compressor 1 and which adds moisture to the compressed air 103a discharged from the compressor 1; and the combustor 2 for burning fuel and high temperature high humidity air 105b which is a mixture of the compressed air with the added fluid to produce combustion gas 106. The two-shaft gas turbine further includes the high-pressure turbine 3H driven by the combustion gas 106 produced in the combustor 2; the low-pressure turbine 3L driven by the combustion gas 107a driving the high-pressure turbine 3H; the first rotating shaft 21H connecting the compressor 1 with the high-pressure turbine 3H; the second rotating shaft 21L which is a rotating shaft of the low-pressure turbine 3L; and the generator 20L which is a first load connected to the second rotating shaft 21L. Further, the two-shaft gas turbine has the generator 20H which is a second load connected to the first rotating shaft 21H. Since the first rotating shaft 21H has a load, the adjustment of this load can easily establish a balance between the power consumption of the compressor 1 and the output power of the high-pressure turbine 3H. Since the two-shaft gas turbine has the control unit 8 which controls the generator 20H as the second load based on the rotation speed of the high-pressure turbine 3H, the balance control can be achieved by the control unit 8.

Because of having the generators as the loads connected to both the respective rotating shafts, the two-shaft gas turbine of the present embodiment can easily exercise operation control, and especially rotation speed control. The two-shaft gas turbine of the present embodiment has the control unit 8 which controls the generator 20L as the first load and the generator 20H as the second load on the basis of the rotation speed of the high-pressure turbine 3H or of the low-pressure turbine 3L. The control unit 8 controls the first generator 20L and the second generator 20H so that the high-pressure turbine 3H and the low-pressure turbine 3L may be rotated at a given rotation speed. Since the two-shaft gas turbine of the present embodiment is configured as described above, the rotation speed can be maintained at a given value by the adjustment of load distribution. Therefore, if the two-shaft gas turbine is used especially for power generation, the request of operation can be met at a given rotation speed. In addition, restrictions on design such as resonance-avoidance can be alleviated. Since the restrictions on design are alleviated, performance, cost and reliability can be improved. Because of operation only at a given rotation speed, the compressor or turbine of a gas turbine that has already been developed for power generation can be diverted. This can reduce cost and concurrently the number of management parts, which also leads to improved reliability.

Incidentally, since the control unit 8 controls the second load, the two-shaft gas turbine in which the flow rate of the high-pressure turbine working gas is relatively greater than that of compressor working gas can produce an effect of easily establishing a balance between the consumption power of the compressor and the output power of the high-pressure turbine. If this load is used for power generation of the generator or for driving of a pump, it goes without saying that power can effectively be used.

Fifteenth Embodiment

Figure 16:
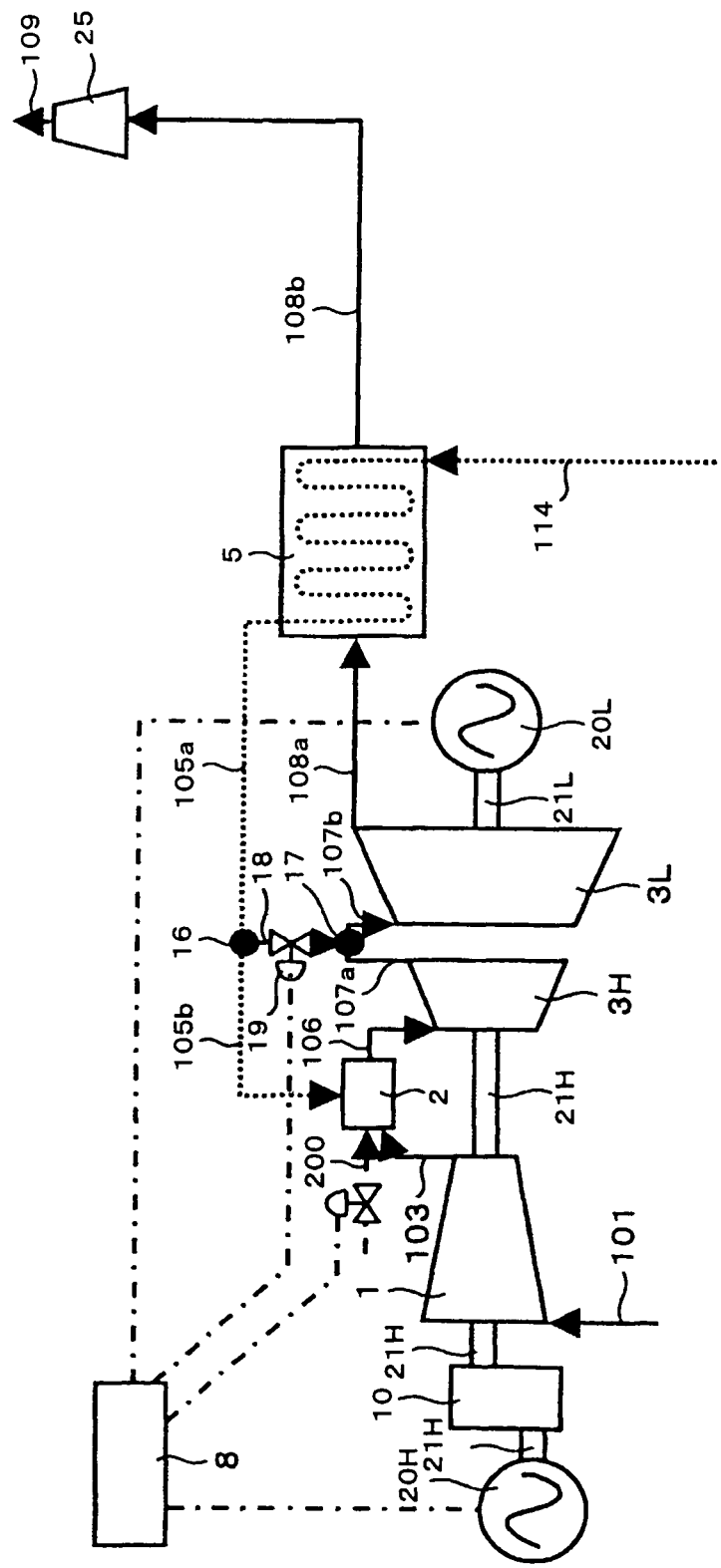
FIG. 16 is a circuit diagram illustrating the entire configuration of a two-shaft type humidity gas turbine system according to a fifteenth embodiment of the present invention.

FIG. 16 is a circuit diagram illustrating the overall configuration of a two-shaft high temperature high humidity gas turbine plant according to the fifteenth embodiment of the present invention.

The plant of the fifteenth embodiment mainly includes a compressor 1, a combustor 2, a high-pressure turbine 3H, a low-pressure turbine 3L, a first generator 20L, a second generator 20H, a control unit 8, an exhaust heat recovery boiler 5, a branch passage 16, and a confluence passage 17, and a flow control valve 19. The explanation of the same configuration as that of the fourteenth embodiment is omitted.

Air 101 introduced into the compressor 1 is compressed to a predetermined pressure and then the compressed air 103 is led to the combustor 2 disposed downstream.

The compressed air 103 led to the combustor 2 is used to burn fuel 200 to produce combustion gas 106, which is led to the high-pressure turbine 3H disposed downstream.

Combustion gas 107a and steam 18 described later led to the confluence passage 17 merges with each other to become mixed gas 107b, which is led to the low-pressure turbine 3L disposed downstream.

The periphery of the low-pressure turbine 3L is the same as that of the fourteenth embodiment. Exhaust gas 108a of the present embodiment is mixed gas of the combustion gas and high temperature high humidity air and lowers in temperature and in pressure as a result of expansion work.

In the exhaust heat recovery boiler 5, feed-water 114 is heated to become steam 117a, which is led to the branch passage 16. The exhaust gas 108a from the low-pressure turbine 3L described above is used as the heat source of the exhaust heat recovery boiler 5. The exhaust gas 108b with lowered temperature resulting from thermal exchange is led to the funnel 25 disposed downstream and vented to the atmosphere.

A given flow rate of the steam 117a led to the branch passage 16 is led as steam 117b to the combustor 2. The remainder is led as steam 18 to the confluence passage 17. Incidentally, the flow rate distribution is controlled by the flow control valve 19.

The two-shaft gas turbine of the present embodiment is different from that of the fourteenth embodiment in that means for adding fluid to the compressed air compressed by the compressor 1 is configured to supply the steam produced by the exhaust heat recovery boiler 5 to the combustor 2. The output adjusting method is the same as that of the fourteenth embodiment. Also it is possible for the flow control valve 19 to adjust the power distribution between the first generator 20L and the second generator 20H. Also the effect is the same as that of the fourteenth embodiment described above.

Sixteenth Embodiment

Figure 17:
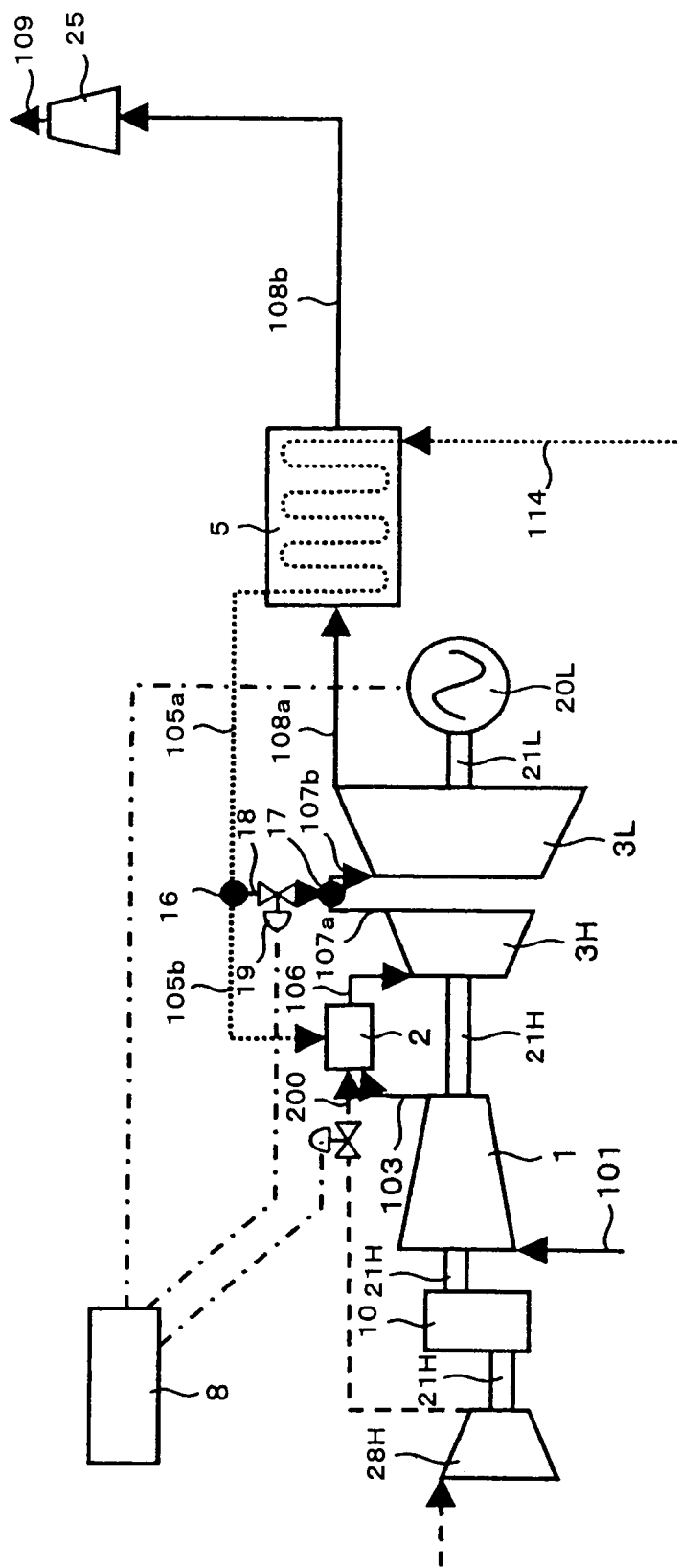
FIG. 17 is a circuit diagram illustrating the entire configuration of a two-shaft type humidity gas turbine system according to a sixteenth embodiment of the present invention.

FIG. 17 is a circuit diagram illustrating the overall configuration of a two-shaft type humidity gas turbine plant according to the sixteenth embodiment of the present invention. Elements denoted with the same reference numerals as those of FIG. 16 have the same functions and their explanation is omitted.

Combustion gas 106 led to the high-pressure turbine 3H performs expansion work to produce rotational power thereof. The compressor 1, the transmission 10 and a fuel pressure-boosting compressor 28H are connected to one another via rotating shafts 21H. A portion of the power produced by the high-pressure turbine 3H is consumed by the compressor 1 and the remaining is consumed by the fuel pressure-boosting compressor 28H. The fuel pressure-boosting compressor 28H boosts the pressure of fuel 200 consumed thereby. The pressure-boosted fuel whose flow rate has been calculated by the control unit 8 is supplied to the combustor 2. The combustion gas 107a performing expansion work to lower in temperature and in pressure is led to the confluence passage 17 described later.

A description is next given of a method of adjusting the output of the two-shaft gas turbine.

In the two-shaft gas turbine of the present embodiment, the control unit 8 calculates the flow rate of input fuel based on demanded electric power. In addition, the control unit 8 exercises control so that the fuel pressure-boosting compressor 28H and the generator 20L may have a given rotation speed by means of the flow control valve 19.

In the two-shaft gas turbine of the present embodiment, since both the rotating shafts have the respective loads, operation control and especially rotation speed control can easily be exercised.

Seventeenth Embodiment

Figure 18:
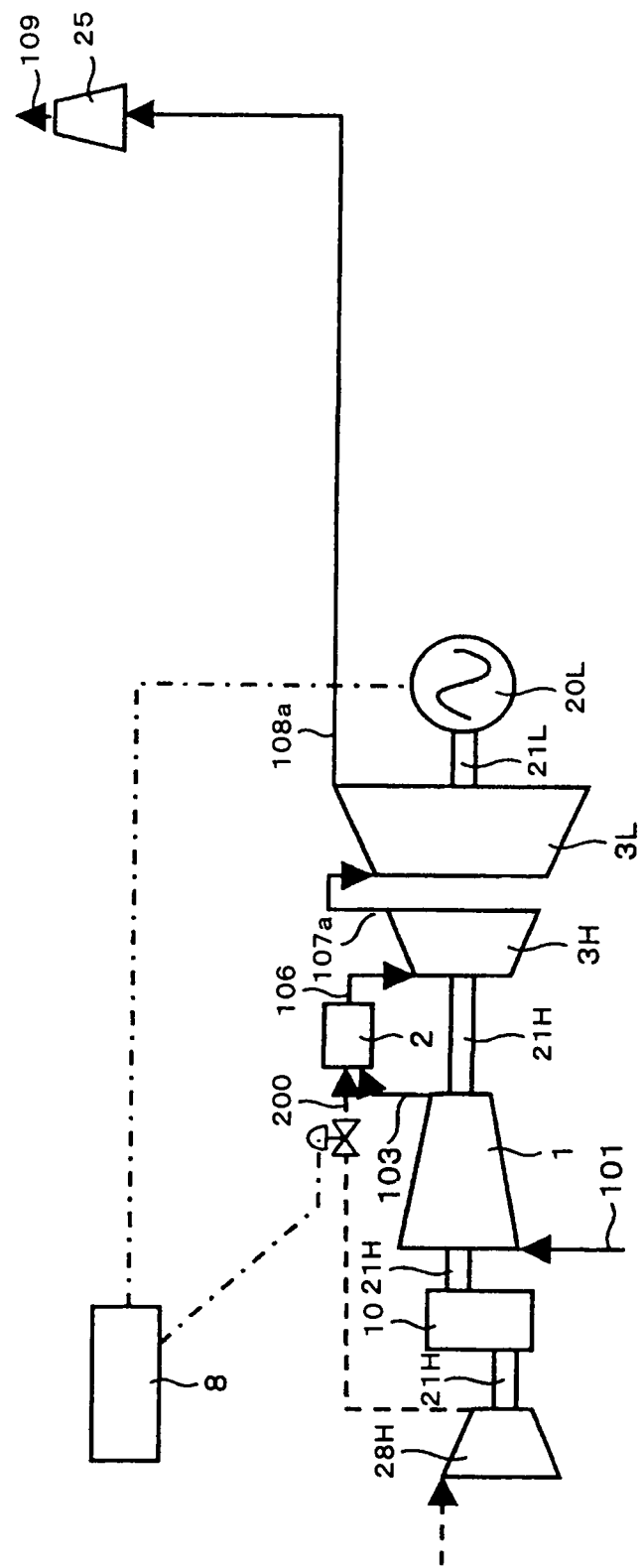
FIG. 18 is a circuit diagram illustrating the entire configuration of a two-shaft gas turbine according to a seventeenth embodiment of the present invention.

FIG. 18 is a circuit diagram illustrating the overall configuration of a two-shaft type humidity gas turbine plant according to a seventeenth embodiment of the present invention.

This plant mainly includes a compressor 1, a combustor 2, a high-pressure turbine 3H, a low-pressure turbine 3L, a generator 20L, a fuel pressure-boosting compressor 28H, and a control unit 8.

Compressed air 103 led to the combustor 2 is used to burn fuel 200 for producing combustion gas 106, which is led to the high-pressure turbine 3H disposed downstream.

The combustion gas 106 led to the high-pressure turbine 3H performs expansion work to produce rotational power therein. The compressor 1, a transmission 10 and the fuel pressure-boosting compressor 28H are connected to one another via the rotating shafts 21H. A portion of the power produced by the high-pressure turbine 3H is consumed by the compressor 1 and the remainder is consumed by the fuel pressure-boosting compressor 28H. The fuel pressure-boosting compressor 28H boosts the pressure of the self-consumed fuel 200. The pressure-boosted fuel whose flow rate has been calculated by the control unit 8 is supplied to the combustor 2. Combustion gas 107a lowering in temperature and in pressure as a result of the expansion work is led to the low-pressure turbine 3L disposed downstream.

Combustion gas 106 led to the low-pressure turbine 3L performs expansion work to produce rotational power therein. The generator 20L is connected to the low-pressure turbine 3L via a rotating shaft 20L. Power produced by the low-pressure turbine 3L is converted by the generator 20L into electric power, which is used by the outside of this plant. Exhaust gas 108a lowered in temperature and in pressure as a result of the expansion work is led to a funnel 25 and vented to the atmosphere. Incidentally, the generator is connected as a load to the compressor in the present embodiment; however, a load such as a pump, etc., or a combination of the generator with another load may be connected to the compressor.

A description is next given of a method of adjusting the output power of the tow-shaft gas turbine.

In the present embodiment, the control unit 8 calculates a flow rate of input fuel based on demanded electric power for input of an appropriate amount of fuel.

The present embodiment provides the effects as below.

The gas turbine of the present embodiment is especially effective as a two-shaft gas turbine that uses a two-shaft gas turbine serving as a base (hereinafter, referred to as a basic gas turbine) and that uses fuel with a heat value smaller than that of fuel planed by the basic gas turbine. To achieve the same combustion temperature as that of the basic gas turbine, fuel corresponding to a heat value of fuel must be inputted. If the basic gas turbine where e.g. liquefied natural gas is planned as fuel uses gasification coal, the heat value of fuel is about one-fifth. Therefore, five times or more the flow rate of input fuel are needed. The input of fuel more than planned one increases the flow rate in the high-pressure turbine 3H compared with the planned one. This produces larger power than that of the planned one. Therefore, a power balance loses between the compressor 1 and the high-pressure turbine 3H, with the result that operation becomes impossible at designed rotation speed. In particular, if the heat value of fuel largely varies, input fuel largely varies to increase the unbalance of power. To solve this problem, the present embodiment has the compressor 20H as a load located on the side of the high-pressure turbine 3H. This eliminates or alleviates the unbalance of power. The gas turbine of the present embodiment is such that both the rotating shafts have the respective loads. Therefore, operation control, and especially rotation speed control can easily be exercised.

The present invention can be applied to a power generation gas turbine as a humid air gas turbine, as well as to a cogeneration system capable of supplying both heat and electricity, and to a gas turbine of a mechanically-driven engine such as a pump, a compressor, a screw, etc.

What is claimed is:

1. An operation method for a two-shaft gas turbine including:
   compressing air using a compressor;
   humidifying the air compressed by the compressor using a humidifier;
   burning, using a combustor, the humidified air, which increases a mass flow rate thereof as a result of being humidified in the humidifier, and a fuel to produce a combustion gas;
   driving a high-pressure turbine coaxially connected to the compressor using the combustion gas produced in the combustor;
   driving a low-pressure turbine using an exhaust gas from the high-pressure turbine, the high-pressure turbine and the low-pressure turbine being configured to have respective independent shafts;
   dividing, using a branch path, a portion of the humidified air before supplying the humidified air to the combustor and leading the portion of the humidified air to the low-pressure turbine; and
   controlling, using a flow control mechanism, the mass flow rate of the humidified air flowing through the branch path;
   allowing the portion of the humidified air to flow not into the high-pressure turbine but into the low-pressure turbine through the branch path;
   controlling the mass flow rate of the portion of the humidified air to prevent an excessive rotation by the flow control mechanism; and
   in a case when a combustion temperature during a rated operation is made equal to a rated combustion temperature of a simple cycle, using the compressor to provide a rotation speed higher than a rated rotation speed due to the increased mass flow of the compressed air as a result of the humidification in the humidifier.

2. A two-shaft gas turbine comprising:
   a compressor configured to compress air;
   a humidifier configured to humidify the air compressed by the compressor;
   a combustor configured to burn the humidified air, which increases a mass flow rate thereof as a result of being humidified in the humidifier, and a fuel to produce a combustion gas
   a high-pressure turbine coaxially connected to the compressor and driven by the combustion gas produced in the combustor;
   a low-pressure turbine driven by an exhaust gas from the high-pressure turbine, the high-pressure turbine and the low-pressure turbine being configured to have respective independent shafts;
   a branch path adapted to divide a portion of the humidified air before supplying the humidified air to the combustor and to lead the portion of the humidified air to the low-pressure turbine; and
   a flow control mechanism configured to control the mass flow rate of the humidified air flowing through the branch path.

3. The two-shaft gas turbine according to claim 2, further comprising:
   a recuperator configured to subject the humidified air to a thermal exchange with the exhaust gas driving the low-pressure turbine;
   wherein the branch path is further adapted to divide the portion of the humidified air flowing therethrough and subjected to the thermal exchange in the recuperator.

4. The two-shaft gas turbine according to claim 3, further comprising a water atomization cooling system configured to spray liquid drops into suction air of the compressor at a suction air inlet of the compressor.

5. The two-shaft gas turbine according to claim 2, further comprising:
   a high-pressure side stationary shroud disposed between a turbine casing and an outer circumferential side of a final stage blade of the high-pressure turbine;
   a cavity defined inside the high-pressure side stationary shroud; and
   a passage adapted to lead the portion of the humidified air divided by the branch path to the cavity from the outside of the turbine casing;
   wherein the high-pressure side stationary shroud has a supply port communicating with a gas path adapted to allow the combustion gas to flow through the inside of the two-shaft gas turbine.

6. The two-shaft gas turbine according to claim 2, further comprising:
   a high-pressure side stationary shroud disposed between a turbine casing and an outer circumferential side of a final stage blade of the high-pressure turbine;
   an intermediate stationary shroud disposed on a downstream side of the high-pressure turbine and inside the turbine casing;
   a cavity defined inside the intermediate stationary shroud; and
   a passage adapted to lead the portion of the humidified air divided by the branch path to the cavity from the outside of the turbine casing;

wherein the intermediate stationary shroud has a supply port communicating with a gas path adapted to allow the combustion gas to flow through the inside of the two-shaft gas turbine.

7. The two-shaft gas turbine according to claim 2, further comprising:
   a high-pressure side stationary shroud disposed between a turbine casing and an outer circumferential side of a final stage blade of the high-pressure turbine;
   a cavity disposed on a downstream side of the high-pressure side stationary shroud and inside the turbine casing so as to communicate with a gas path; and
   a path adapted to lead the portion of the humidified air divided by the branch path to the cavity from the outside of the turbine casing.

8. The two-shaft gas turbine according to claim 2,
   wherein a cavity is defined between a turbine casing and an outer circumferential side of an initial stage nozzle of the low-pressure turbine;
   wherein a wheel space is defined on an inner circumferential side of the initial stage nozzle of the low-pressure turbine and between a rotor end face of the high-pressure turbine and a rotor end face of the low-pressure turbine;
   wherein the initial stage nozzle is formed with an internal passage through which the humidified air internally flows; and
   wherein a passage is provided to lead the portion of the humidified air divided by the branch path from the outside of the turbine casing using the cavity and using the internal passage of the initial stage nozzle into the wheel space.

9. The two-shaft gas turbine according to claim 8,
   wherein the internal passage of the initial stage nozzle has a blowoff hole communicating with the gas path.

10. The two-shaft gas turbine according to claim 8,
    wherein a rotor of the low-pressure turbine is provided with a passage adapted to allow the wheel space to communicate with a root side of the initial stage blade of the low-pressure turbine.

11. The two-shaft gas turbine according to claim 2, further comprising:
    a branch flow rate adjusting mechanism configured to control the mass flow rate of the portion of the humidified air divided by the branch path.

12. The two-shaft gas turbine according to claim 2,
    wherein the branch path is configured to connect with a passage adapted to lead the exhaust gas after the driving from the high-pressure turbine to the low-pressure turbine.

13. The two-shaft gas turbine according to claim 2,
    wherein the mass flow rate of the portion of the humidified air divided by the branch path is 10-25% of a mass flow rate of air sucked into the compressor.

14. The two-shaft gas turbine according to claim 2, further comprising:
    a branch flow rate adjusting mechanism configured to control the mass flow rate of the portion of the humidified air divided by the branch path in a range of flow rates smaller than the increased flow rate as a result of the humidification in the humidifier.

15. A modeling method for a two-shaft gas turbine including:
    compressing air using a compressor;
    burning, using a combustor, the air compressed by the compressor and a fuel to produce a combustion gas;
    driving a high-pressure turbine coaxially connected to the compressor using the combustion gas produced in the combustor; and
    driving a low pressure turbine using an exhaust gas from the high-pressure turbine, the high-pressure turbine and the low-pressure turbine being configured to have respective independent shafts;
    humidifying the air compressed by the compressor using a humidifier;
    dividing, using a branch path, a portion of the humidified air, which increases a mass flow rate thereof by being humidified in the humidifier before supplying the humidified air to the combustor and to lead the portion of the humidified air to the low-pressure turbine; and
    controlling, using a flow control mechanism, the mass flow rate of the humidified air flowing through the branch path.

\* \* \* \* \*